(12) United States Patent
Manolakos et al.

(10) Patent No.: US 11,743,752 B2
(45) Date of Patent: Aug. 29, 2023

(54) DYNAMIC CONFIGURATION OF MEASUREMENT GAPS

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 95 days.

(21) Appl. No.: 17/471,016

(22) Filed: Sep. 9, 2021

(65) Prior Publication Data

US 2022/0086675 A1 Mar. 17, 2022

Related U.S. Application Data

(60) Provisional application No. 63/078,164, filed on Sep. 14, 2020.

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04L 5/0051* (2013.01); *H04W 64/006* (2013.01)

(58) Field of Classification Search
CPC ...... H04W 24/10; H04W 72/04; H04W 24/08
See application file for complete search history.

(56) References Cited

U.S. PATENT DOCUMENTS

2015/0327104 A1 11/2015 Yiu et al.
2018/0295600 A1* 10/2018 Kumar ................. H04L 5/0051
(Continued)

FOREIGN PATENT DOCUMENTS

WO WO-2018213396 A1 11/2018

OTHER PUBLICATIONS

Intel Corporation: "Summary of RAN1 Agreements on NR Positioning", 3GPP TSG RAN WG1 Meeting #98, 3GPP Draft, R1-1909919, 98-SUMMARY-NR-POS, 3rd Generation Partnership Project, Mobile Competence Centre, 350, Route Des Lucioles, F-06921 Sophia-Antipolis Cedex, France, vol. RAN WG1, No. Prague, CZ, Aug. 26, 2019-Aug. 30, 2019, pp. 1-29, Sep. 27, 2019, XP051782878.
(Continued)

*Primary Examiner* — Zhiren Qin
(74) *Attorney, Agent, or Firm* — Chui-Kiu Teresa Wong

(57) ABSTRACT

Disclosed are various techniques for wireless communication. In an aspect, a user equipment (UE) may determine a plurality of measurement gap (MG) configurations, each MG configuration defining one or more MGs. The UE may send, to a serving base station, a request to use a first MG configuration from the plurality of MG configurations, and may receive a response to the first request. The UE then measures positioning signals using an MG configuration indicated by the response. Based on measurements of the first set of positioning signals, the UE may select a second MG configuration, send a second request to use the second MG configuration, and receive a response to the second request. The UE then measures a second set of positioning signals using an MG configuration indicated by the response to the second request.

46 Claims, 20 Drawing Sheets

(51) Int. Cl.
*H04L 5/00* (2006.01)
*H04W 64/00* (2009.01)

(56) References Cited

U.S. PATENT DOCUMENTS

| | | | | |
|---|---|---|---|---|
| 2019/0052996 | A1* | 2/2019 | Sahai | H04W 24/10 |
| 2019/0098601 | A1* | 3/2019 | Kumar | H04W 72/563 |
| 2019/0101615 | A1* | 4/2019 | Tenny | G01S 5/10 |
| 2019/0393970 | A1* | 12/2019 | Kumar | H04B 17/345 |
| 2020/0014487 | A1 | 1/2020 | Akkarakaran et al. | |
| 2021/0014751 | A1* | 1/2021 | Callender | H04W 72/0446 |
| 2021/0329618 | A1* | 10/2021 | Chervyakov | G01S 5/0221 |
| 2021/0345148 | A1* | 11/2021 | Lin | H04W 72/23 |

OTHER PUBLICATIONS

International Search Report and Written Opinion—PCT/US2021/049875—ISA/EPO—dated Feb. 25, 2022.

Ericsson: "On Measurement Gaps for Dense PRS", 3GPP Draft, 3GPP TSG-RAN WG4 Meeting #86, R4-1802854, On Measurements Gaps for Dense PRS, 3rd Generation Partnership Project (3GPP), Mobile Competence Centre, 650, Route Des Lucioles, F-06921, Sophia-Antipolis Cedex, France, vol. RAN WG4. No. Athens, GR; Feb. 26, 2018-Mar. 2, 2018, Feb. 19, 2018 (Feb. 19, 2018), XP051402943, 3 pages, Retrieved from the Internet: URL: http://www.3gpp.org/ftp/tsg%5Fran/WG4%5FRadio/TSGR4%5F86/Docs/ [retrieved on Feb. 19, 2018] p. 2, 2. Discussion—Proposal 1—Proposal 2—Proposal 6.

Intel Corporation, et al., "Motivation to Introduce New Rel-17 WI on NR Measurement Gap Enhancements," 3GPP Draft, 3GPP TSG RAN Meeting #89e, RP-201887, 3rd Generation Partnership Project (3GPP), Mobile Competence Centre, 650, Route Des Lucioles, F-06921, Sophia-Antipolis Cedex, France, vol. TSG RAN. No. E-meeting, Sep. 14, 2020-Sep. 18, 2020, Sep. 7, 2020 (Sep. 7, 2020), XP051931738, 6 pages, Retrieved from the Internet: URL: https://ftp.3gpp.org/tsg_ran/TSG_RAN/TSGR_89e/Docs/RP-201887.zip RP-201887- Motivation to introduce new R17 WI on NR MG enhancements v2.doc [retrieved on Sep. 7, 2020] 2.1 Justification of MG enhancement 2.1. MG configuration to cover multiple flexible SMTCs, figure 1 2.4, New MG patterns for positioning measurement.

LG Electronics: "Discussion on the Use of RSS for Measurement Improvement," 3GPP Draft, 3GPP TSG RAN WG1 Meeting #99, R1-1912381, 3rd Generation Partnership Project (3GPP), Mobile Competence Centre, 650, Route Des Lucioles, F-06921, Sophia-Antipolis Cedex, France, vol. RAN WG1. No. Reno. USA, Nov. 18, 2019-Nov. 22, 2019, Nov. 9, 2019 (Nov. 9, 2019), XP051823387, 5 pages, Retrieved from the Internet: URL: https://ftp.3gpp.org/tsg_ran/WG1_RL1/TSGR1_99/Docs/R1-1912381.zip R1-1912381 Discussion on the use of RSS for measurement improvement.docx [retrieved on Nov. 9, 2019] 2. Discussion.

Partial International Search Report—PCT/US2021/049875—ISA/EPO—dated Dec. 9, 2021.

Qualcomm Inc: "New WID on Enhancements to Measurement Gaps for NR," 3GPP Draft, 3GPP TSG RAN Meeting #88e, RP-201000, 3rd Generation Partnership Project (3GPP), Mobile Competence Centre, 650, Route Des Lucioles, F-06921, Sophia-Antipolis Cedex, France, vol. TSG RAN. No. Electronic Meeting, Jun. 29, 2020-Jul. 3, 2020, Jun. 22, 2020 (Jun. 22, 2020), XP051903663, 6 pages, retrieved from the Internet: URL: https://ftp.3gpp.org/tsg_ran/TSG_RAN/TSGR_88e/Docs/RP-201000.zip RP-201000.doc [retrieved on Jun. 22, 2020] 3. Justification 11 MG with longer length/periodicity.

\* cited by examiner

DYNAMIC CONFIGURATION OF MEASUREMENT GAPS

CROSS-REFERENCE TO RELATED APPLICATION

This application claims priority to U.S. Provisional Patent Application No. 63/078,164, filed Sep. 14, 2020, entitled "DYNAMIC CONFIGURATION OF MEASUREMENT GAPS," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes determining a plurality of measurement gap (MG) configurations, each MG configuration defining one or more MGs, each MG having a measurement gap length (MGL) and a measurement gap offset (MGO); sending, to a serving base station, a first request to use a first MG configuration from the plurality of MG configurations; receiving, from the serving base station, a response to the first request; measuring a first set of positioning signals using an MG configuration indicated by the response to the first request; selecting, based on measurements of the first set of positioning signals, a second MG configuration from the plurality of MG configurations; sending, to the serving base station, a second request to use the second MG configuration from the plurality of MG configurations; receiving, from the serving base station, a response to the second request; and measuring a second set of positioning signals using an MG configuration indicated by the response to the second request.

In an aspect, a method of wireless communication performed by a UE includes determining a plurality of MG configurations, each MG configuration defining one or more MGs, each MG having a MGL and a MGO and indicating a reference cell for measurement reporting; measuring a first set of positioning signals using one MG configuration from the plurality of MG configurations; and reporting the measurement to the reference cell for measurement reporting indicated by the one MG configuration.

In an aspect, a method of wireless communication performed by a UE includes determining a plurality of MG configurations, each MG configuration defining one or more MGs, each MG having a MGL and a MGO; sending, to a serving base station, a first request to use a first MG configuration from the plurality of MG configurations; receiving, from the serving base station, a response to the first request; measuring a first set of positioning signals using an MG configuration indicated by the response to the first request; sending, to the serving base station, a request to receive an updated plurality of MG configurations; receiving, from the serving base station, the updated plurality of MG configurations, the updated plurality of MG configurations comprising at least one new MG configuration; and measuring a second set of positioning signals using an MG configuration from among the updated plurality of MG configurations.

In an aspect, a method of wireless communication performed by a network entity includes sending, to a UE, a plurality of MG configurations, each MG configuration defining an MG having a MGL and a MGO; receiving, from the UE, a first request to use a first MG configuration from the plurality of MG configurations; sending, to the UE, a response to the first request, the response indicating an MG configuration to be used by the UE; receiving, from the UE, a second request to change at least one MG configuration; and sending, to the UE, a response to the second request to change at least one MG configuration.

In an aspect, a UE includes a memory; at least one transceiver; and at least one processor communicatively coupled to the memory and the at least one transceiver, the at least one processor configured to: determine a plurality of MG configurations, each MG configuration defining one or more MGs, each MG having a MGL and a MGO; send, via the at least one transceiver, to a serving base station, a first request to use a first MG configuration from the plurality of MG configurations; receive, via the at least one transceiver, from the serving base station, a response to the first request; measure a first set of positioning signals using an MG configuration indicated by the response to the first request; select, based on measurements of the first set of positioning signals, a second MG configuration from the plurality of MG configurations; send, via the at least one transceiver, to the serving base station, a second request to use the second MG configuration from the plurality of MG configurations; receive, via the at least one transceiver, from the serving base station, a response to the second request; and measure a second set of positioning signals using an MG configuration indicated by the response to the second request.

In an aspect, a UE includes a memory; at least one transceiver; and at least one processor communicatively coupled to the memory and the at least one transceiver, the at least one processor configured to: determine a plurality of MG configurations, each MG configuration defining one or more MGs, each MG having a MGL and a MGO and indicating a reference cell for measurement reporting; measure a first set of positioning signals using one MG configuration from the plurality of MG configurations; and report the measurement to the reference cell for measurement reporting indicated by the one MG configuration.

In an aspect, a UE includes a memory; at least one transceiver; and at least one processor communicatively coupled to the memory and the at least one transceiver, the at least one processor configured to: determine a plurality of MG configurations, each MG configuration defining one or more MGs, each MG having a MGL and a MGO; send, via the at least one transceiver, to a serving base station, a first request to use a first MG configuration from the plurality of MG configurations; receive, via the at least one transceiver, from the serving base station, a response to the first request; measure a first set of positioning signals using an MG configuration indicated by the response to the first request; send, via the at least one transceiver, to the serving base station, a request to receive an updated plurality of MG configurations; receive, via the at least one transceiver, from the serving base station, the updated plurality of MG configurations, the updated plurality of MG configurations comprising at least one new MG configuration; and measure a second set of positioning signals using an MG configuration from among the updated plurality of MG configurations.

In an aspect, a network entity includes a memory; at least one transceiver; and at least one processor communicatively coupled to the memory and the at least one transceiver, the at least one processor configured to: send, via the at least one transceiver, to a UE, a plurality of MG configurations, each MG configuration defining an MG having a MGL and a MGO; receive, via the at least one transceiver, from the UE, a first request to use a first MG configuration from the plurality of MG configurations; send, via the at least one transceiver, to the UE, a response to the first request, the response indicating an MG configuration to be used by the UE; receive, via the at least one transceiver, from the UE, a second request to change at least one MG configuration; and send, via the at least one transceiver, to the UE, a response to the second request to change at least one MG configuration.

In an aspect, a UE includes means for determining a plurality of MG configurations, each MG configuration defining one or more MGs, each MG having a MGL and a MGO; means for sending, to a serving base station, a first request to use a first MG configuration from the plurality of MG configurations; means for receiving, from the serving base station, a response to the first request; means for measuring a first set of positioning signals using an MG configuration indicated by the response to the first request; means for selecting, based on measurements of the first set of positioning signals, a second MG configuration from the plurality of MG configurations; means for sending, to the serving base station, a second request to use the second MG configuration from the plurality of MG configurations; means for receiving, from the serving base station, a response to the second request; and means for measuring a second set of positioning signals using an MG configuration indicated by the response to the second request.

In an aspect, a UE includes means for determining a plurality of MG configurations, each MG configuration defining one or more MGs, each MG having a MGL and a MGO and indicating a reference cell for measurement reporting; means for measuring a first set of positioning signals using one MG configuration from the plurality of MG configurations; and means for reporting the measurement to the reference cell for measurement reporting indicated by the one MG configuration.

In an aspect, a UE includes means for determining a plurality of MG configurations, each MG configuration defining one or more MGs, each MG having a MGL and a MGO; means for sending, to a serving base station, a first request to use a first MG configuration from the plurality of MG configurations; means for receiving, from the serving base station, a response to the first request; means for measuring a first set of positioning signals using an MG configuration indicated by the response to the first request; means for sending, to the serving base station, a request to receive an updated plurality of MG configurations; means for receiving, from the serving base station, the updated plurality of MG configurations, the updated plurality of MG configurations comprising at least one new MG configuration; and means for measuring a second set of positioning signals using an MG configuration from among the updated plurality of MG configurations.

In an aspect, a network entity includes means for sending, to a UE, a plurality of MG configurations, each MG configuration defining an MG having a MGL and a MGO; means for receiving, from the UE, a first request to use a first MG configuration from the plurality of MG configurations; means for sending, to the UE, a response to the first request, the response indicating an MG configuration to be used by the UE; means for receiving, from the UE, a second request to change at least one MG configuration; and means for sending, to the UE, a response to the second request to change at least one MG configuration.

In an aspect, a non-transitory computer-readable medium storing computer-executable instructions that, when executed by a UE, cause the UE to: determine a plurality of MG configurations, each MG configuration defining one or more MGs, each MG having a MGL and a MGO; send, to a serving base station, a first request to use a first MG configuration from the plurality of MG configurations; receive, from the serving base station, a response to the first request; measure a first set of positioning signals using an MG configuration indicated by the response to the first request; select, based on measurements of the first set of positioning signals, a second MG configuration from the plurality of MG configurations; send, to the serving base station, a second request to use the second MG configuration from the plurality of MG configurations; receive, from the serving base station, a response to the second request; and measure a second set of positioning signals using an MG configuration indicated by the response to the second request.

In an aspect, a non-transitory computer-readable medium storing computer-executable instructions that, when executed by an UE, cause the UE to: determine a plurality of MG configurations, each MG configuration defining one or more MGs, each MG having a MGL and a MGO and indicating a reference cell for measurement reporting; measure a first set of positioning signals using one MG configuration from the plurality of MG configurations; and report the measurement to the reference cell for measurement reporting indicated by the one MG configuration.

In an aspect, a non-transitory computer-readable medium storing computer-executable instructions that, when executed by an UE, cause the UE to: determine a plurality of MG configurations, each MG configuration defining one or more MGs, each MG having a MGL and a MGO; send, to a serving base station, a first request to use a first MG configuration from the plurality of MG configurations; receive, from the serving base station, a response to the first request; measure a first set of positioning signals using an MG configuration indicated by the response to the first request; send, to the serving base station, a request to receive an updated plurality of MG configurations; receive, from the serving base station, the updated plurality of MG configurations, the updated plurality of MG configurations comprising at least one new MG configuration; and measure a second set of positioning signals using an MG configuration from among the updated plurality of MG configurations.

In an aspect, a non-transitory computer-readable medium storing computer-executable instructions that, when executed by a network entity, cause the network entity to: send, to a UE, a plurality of MG configurations, each MG configuration defining an MG having a MGL and a MGO; receive, from the UE, a first request to use a first MG configuration from the plurality of MG configurations; send, to the UE, a response to the first request, the response indicating an MG configuration to be used by the UE; receive, from the UE, a second request to change at least one MG configuration; and send, to the UE, a response to the second request to change at least one MG configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
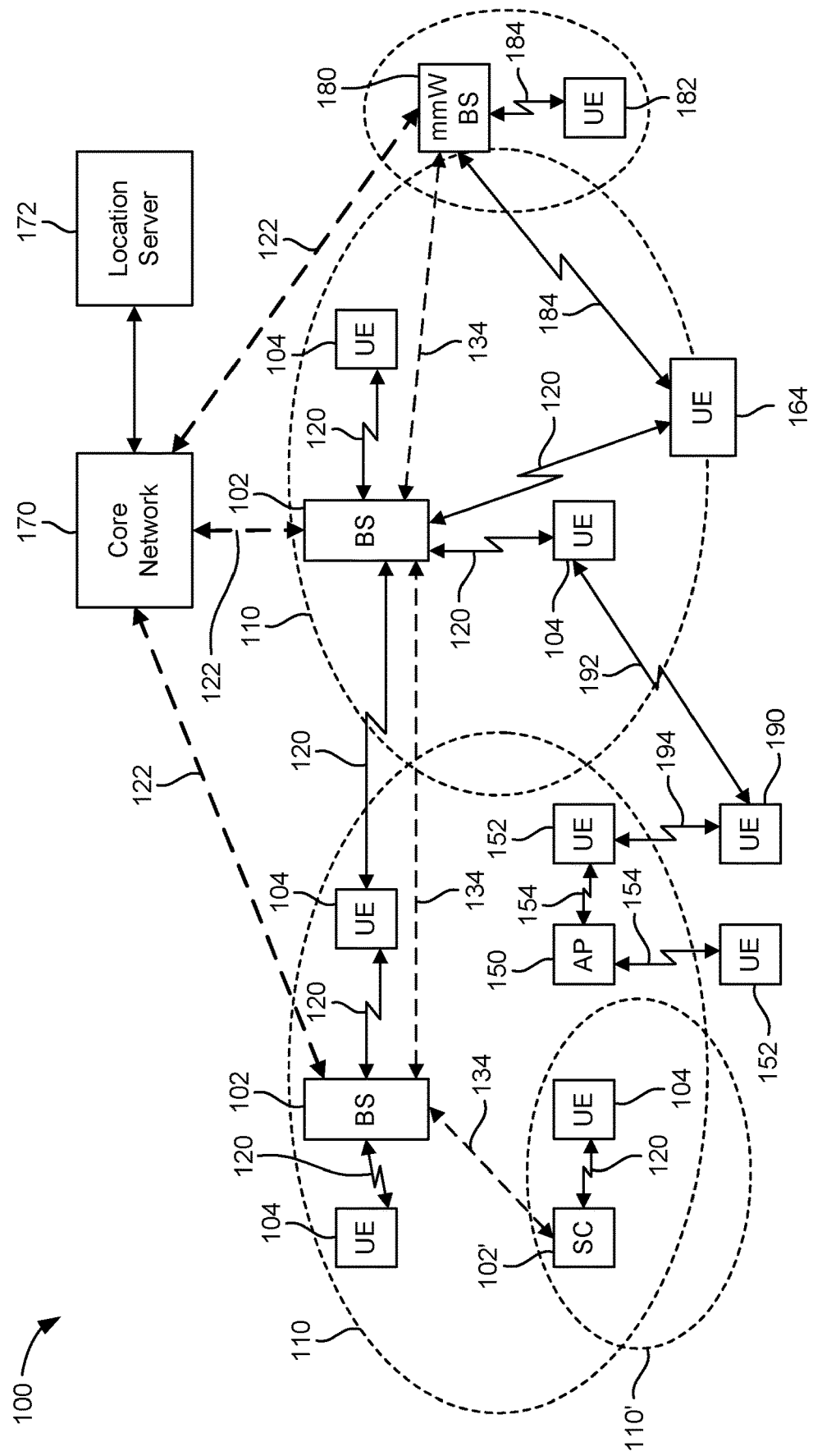
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network entity, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network entity (e.g., a base station) broadcasts an RF signal, it broadcasts the signal in all directions (omni-directionally). With transmit beamforming, the network entity determines where a given target device (e.g., a UE) is located (relative to the transmitting network entity) and projects a stronger downlink RF signal in that specific direction, thereby providing a faster (in terms of data rate) and stronger RF signal for the receiving device(s). To change the directionality of the RF signal when transmitting, a network entity can control the phase and relative amplitude of the RF signal at each of the one or more transmitters that are broadcasting the RF signal. For example, a network entity may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network entity themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
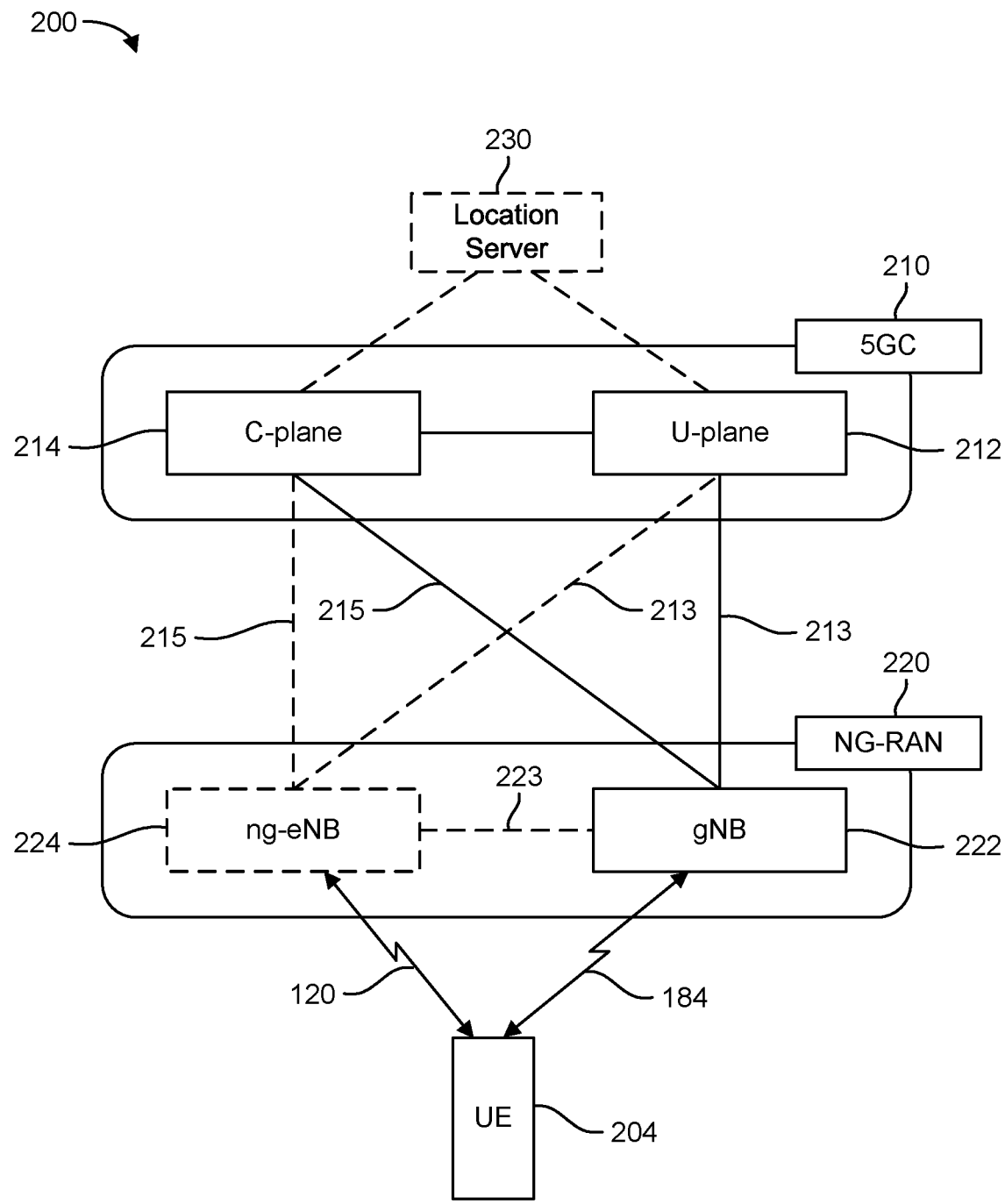
FIGS. 2A and 2B illustrate example wireless network structures, according to various aspects.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C)

215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
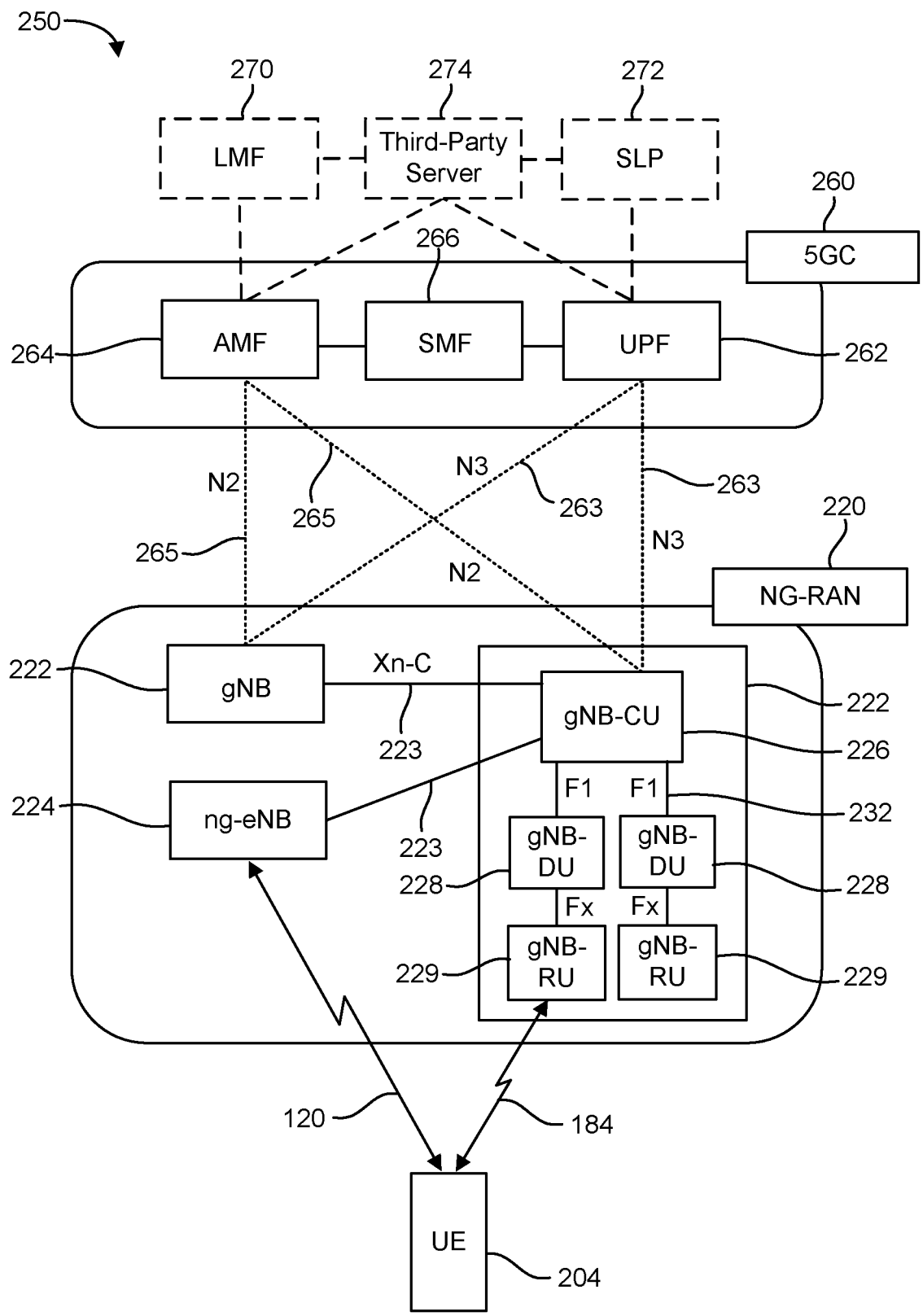

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
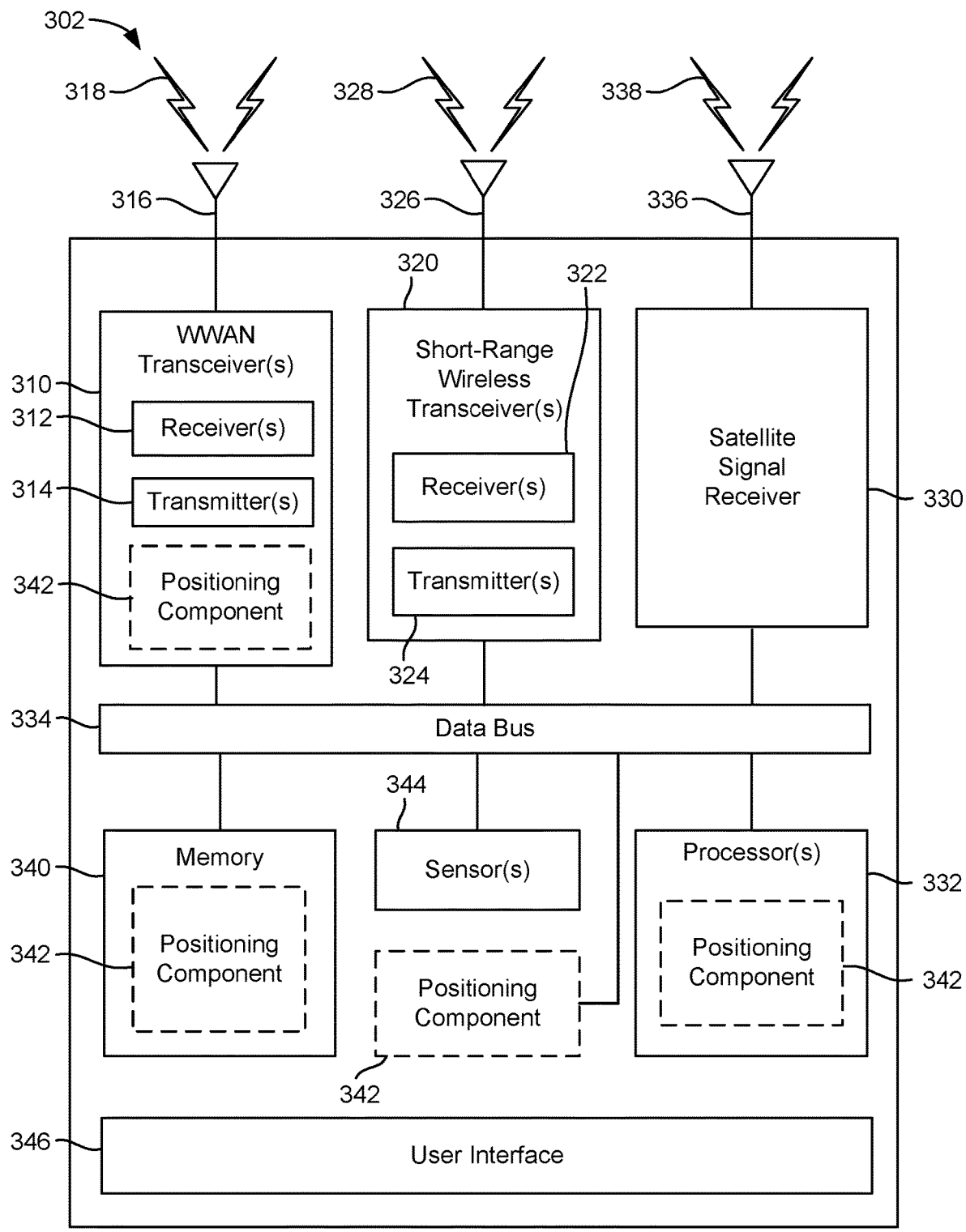
FIGS. 3A, 3B, and 3C are simplified block diagrams of several sample aspects of components that may be employed in a user equipment (UE), a base station, and a network entity, respectively, and configured to support communications as taught herein.
Figure 3B:
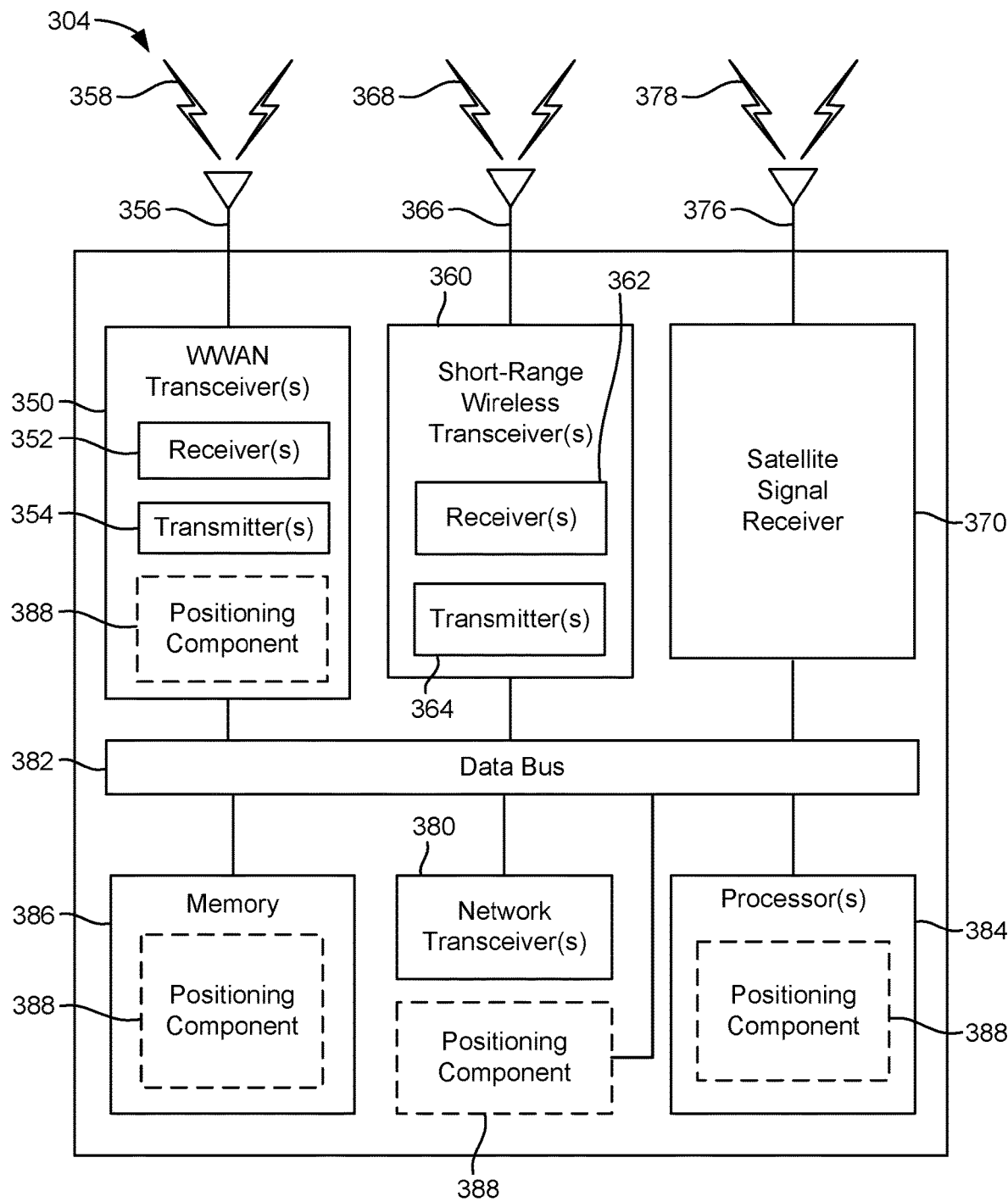
Figure 3C:
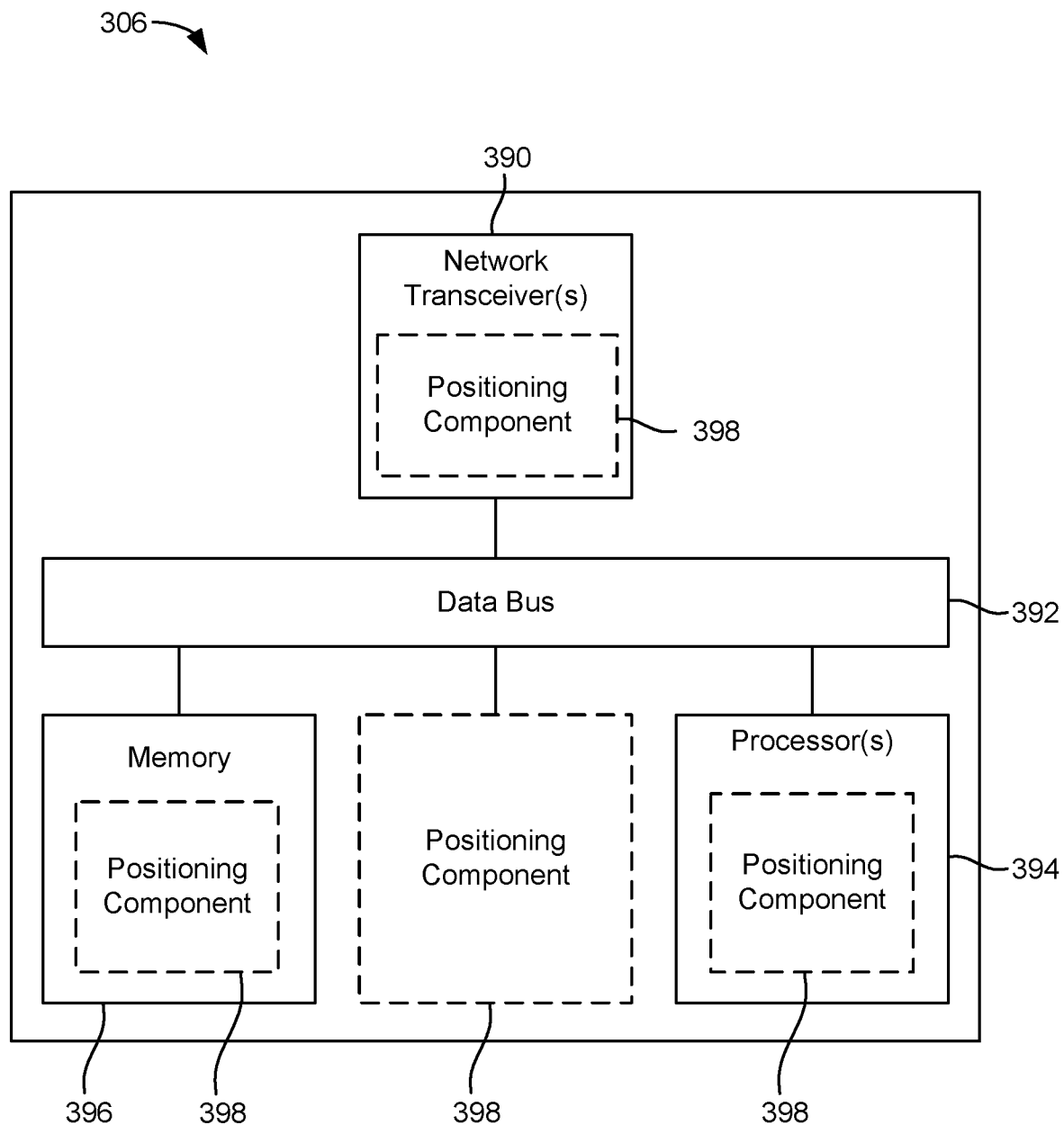

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, NRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LWF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network entities itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network entities (e.g., base stations and UEs).

Figure 4A:
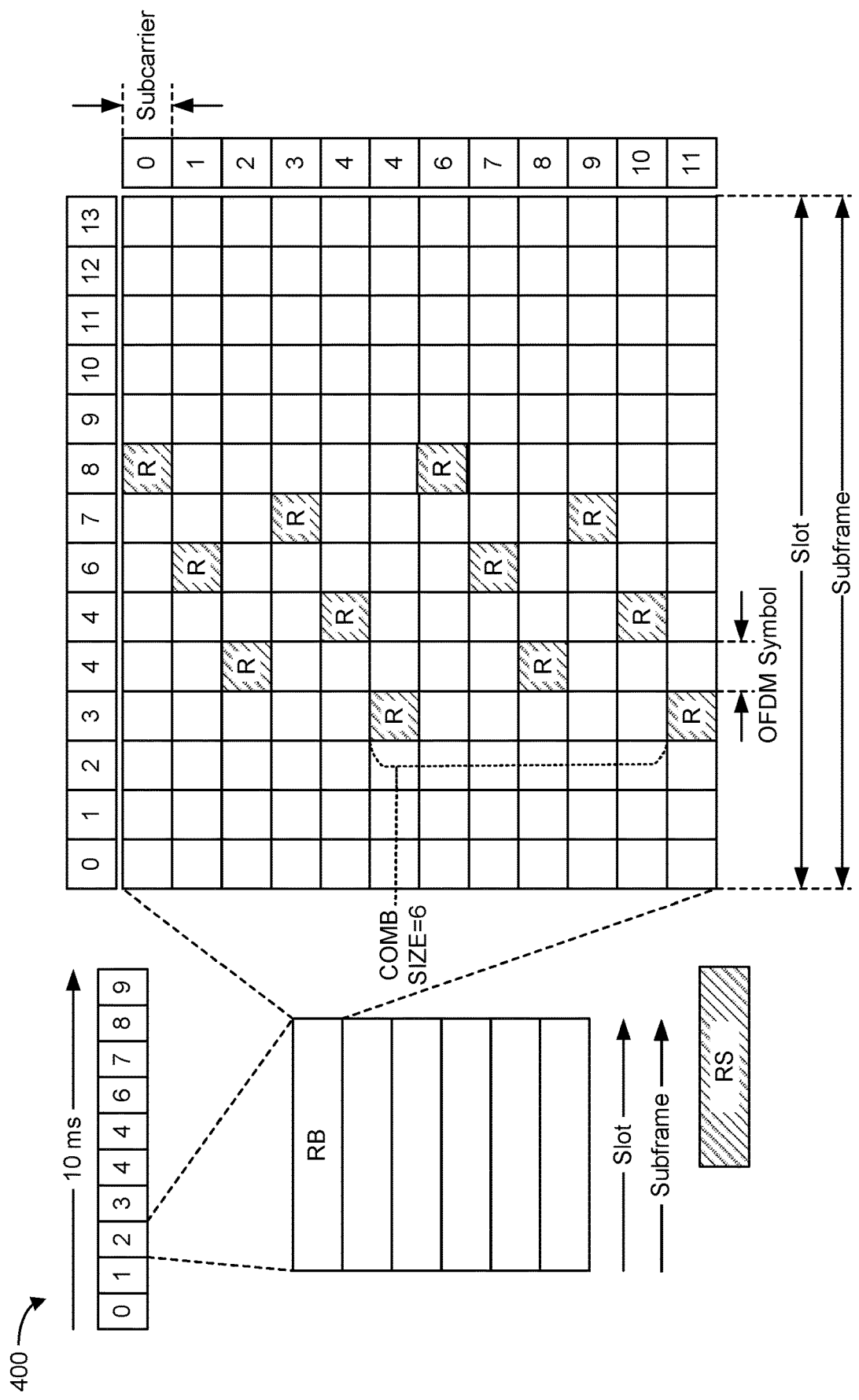
FIGS. 4A and 4B are diagrams illustrating example frame structures and channels within the frame structures, according to aspects of the disclosure.

FIG. 4A is a diagram 400 illustrating an example of a downlink frame structure, according to aspects of the disclosure.

Figure 4B:
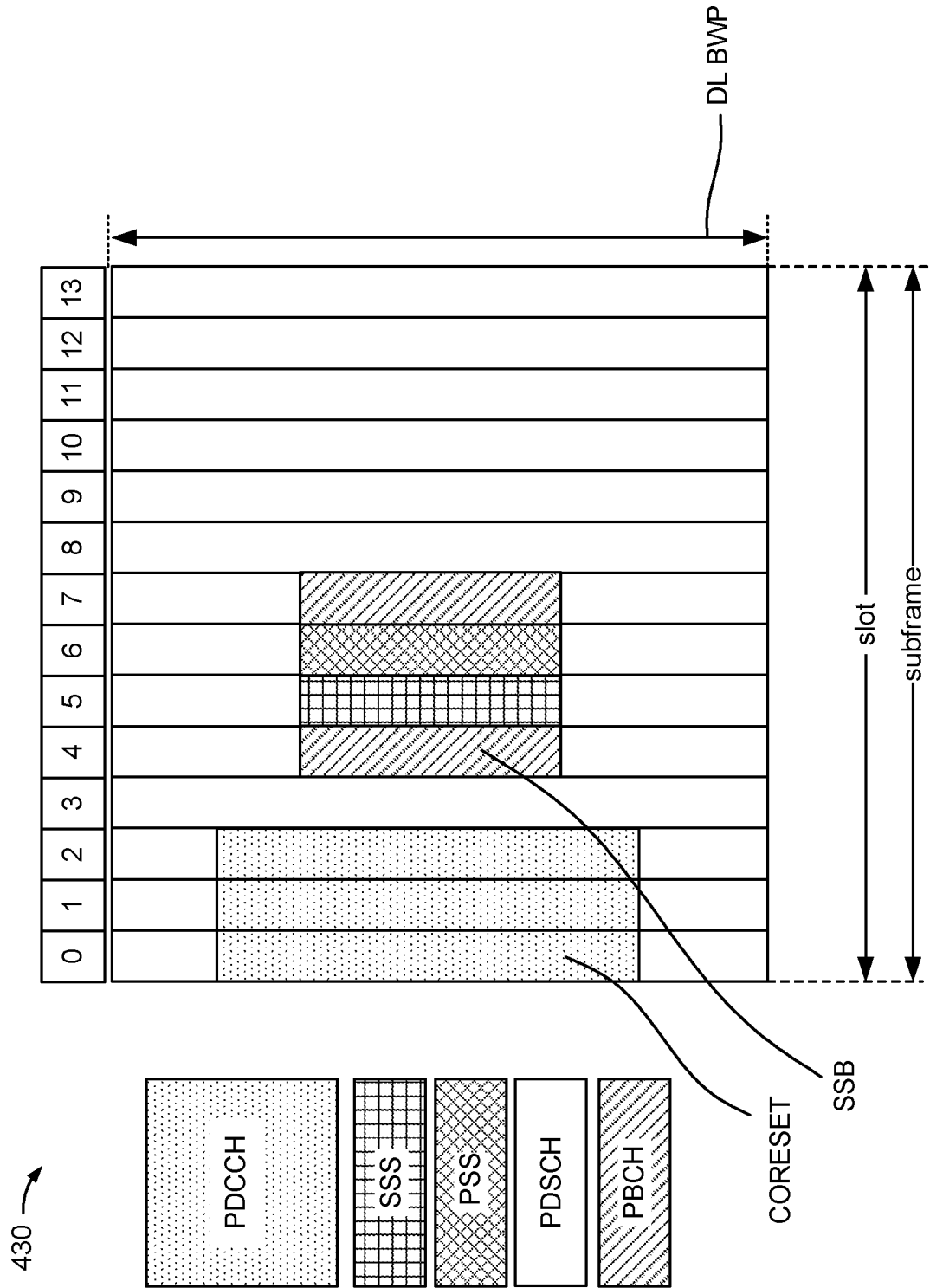

FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (u), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Symbol Duration (ms) | Symbol Duration (μs) | Max nominal system BW (MHz) with 4K FFT size |
| --- | --- | --- | --- | --- | --- | --- | --- |
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL-PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
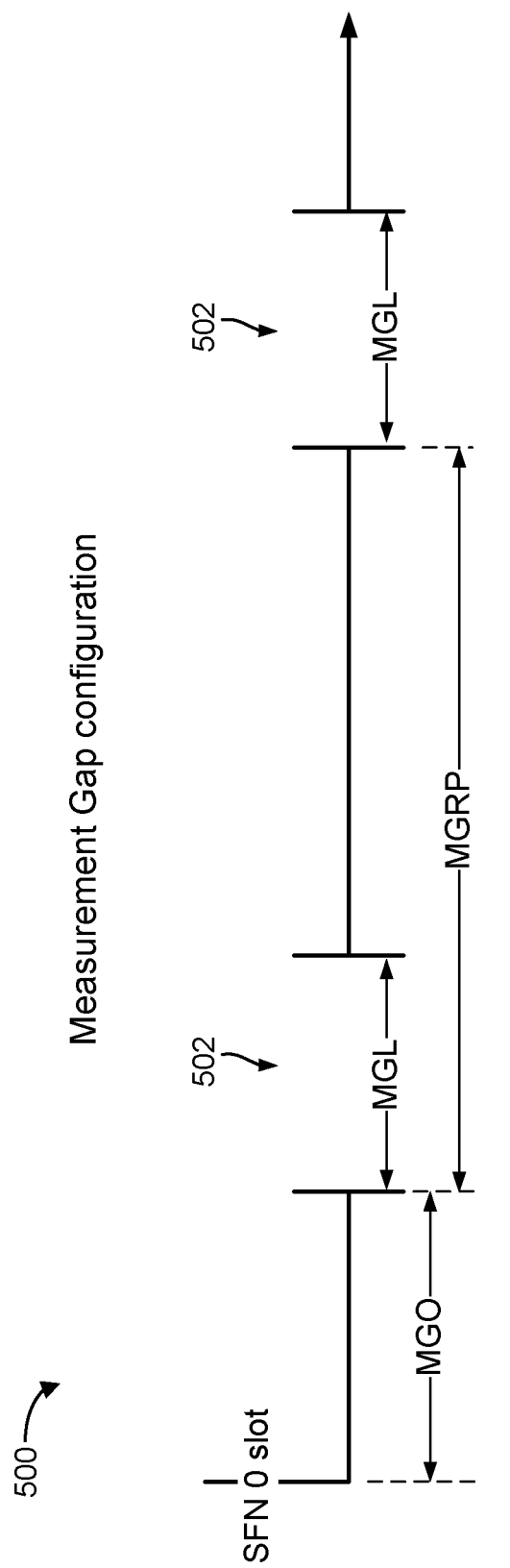
FIG. 5 is a diagram illustrating how the parameters of a measurement gap configuration specify a pattern of measurement gaps, according to aspects of the disclosure.

FIG. 5 is a diagram illustrating how the parameters of a measurement gap configuration 500 specify a pattern of measurement gaps 502, according to aspects of the disclosure. The measurement gap offset (MGO) is the offset of the start of the gap pattern from the start of a slot or subframe within the measurement gap repetition period (MGRP). There are currently about 160 offset values, but not all of the values are applicable for all periodicities. More specifically, the offset has a value in the range from '0' to one less than the MGRP. Thus, for example, if the MGRP is 20 ms, then the offset can range from '0' to '19.' The measurement gap length (MGL) is the length of the measurement gap in milliseconds. The measurement gap length can have a value of 1.5 ms, 3 ms, 3.5 ms, 4 ms, 5.5 ms, or 6 ms. The MGRP defines the periodicity (in milliseconds) at which the measurement gap 502 repeats. It can have a value of 20 ms, 40 ms, 80 ms, or 160 ms. Although not shown in FIG. 5, a measurement gap configuration 500 may also include a measurement gap timing advance (MGTA) parameter. If configured, the MGTA indicates the amount of time before the occurrence of the slot or subframe in which the measurement gap is 502 configured to begin. Currently, the MGTA can be 0.25 ms for FR2 or 0.5 ms for FR1.

This is currently a discussion to introduce additional MG patterns with MGL≥10 ms and MGRP≥80 ms. It is not yet decided whether the new MG patterns will or will not be applicable for RRM measurement, and details of the new MG patterns are not yet specified. Candidate values for MGL include 10 ms, 18 ms, 20 ms, 34 ms, 40 ms, and 50 ms. Candidate values for MGRP include 80 ms, 160 ms, 320 ms, and 640 ms. The values for combinations of MGL and MGRP are not yet specified, but combinations under discussion include MGL=40 ms and MGRP=160 ms, MGL=34 ms and MGRP=160 ms, and MGL=18 ms and MGRP=160 ms.

Figure 6:
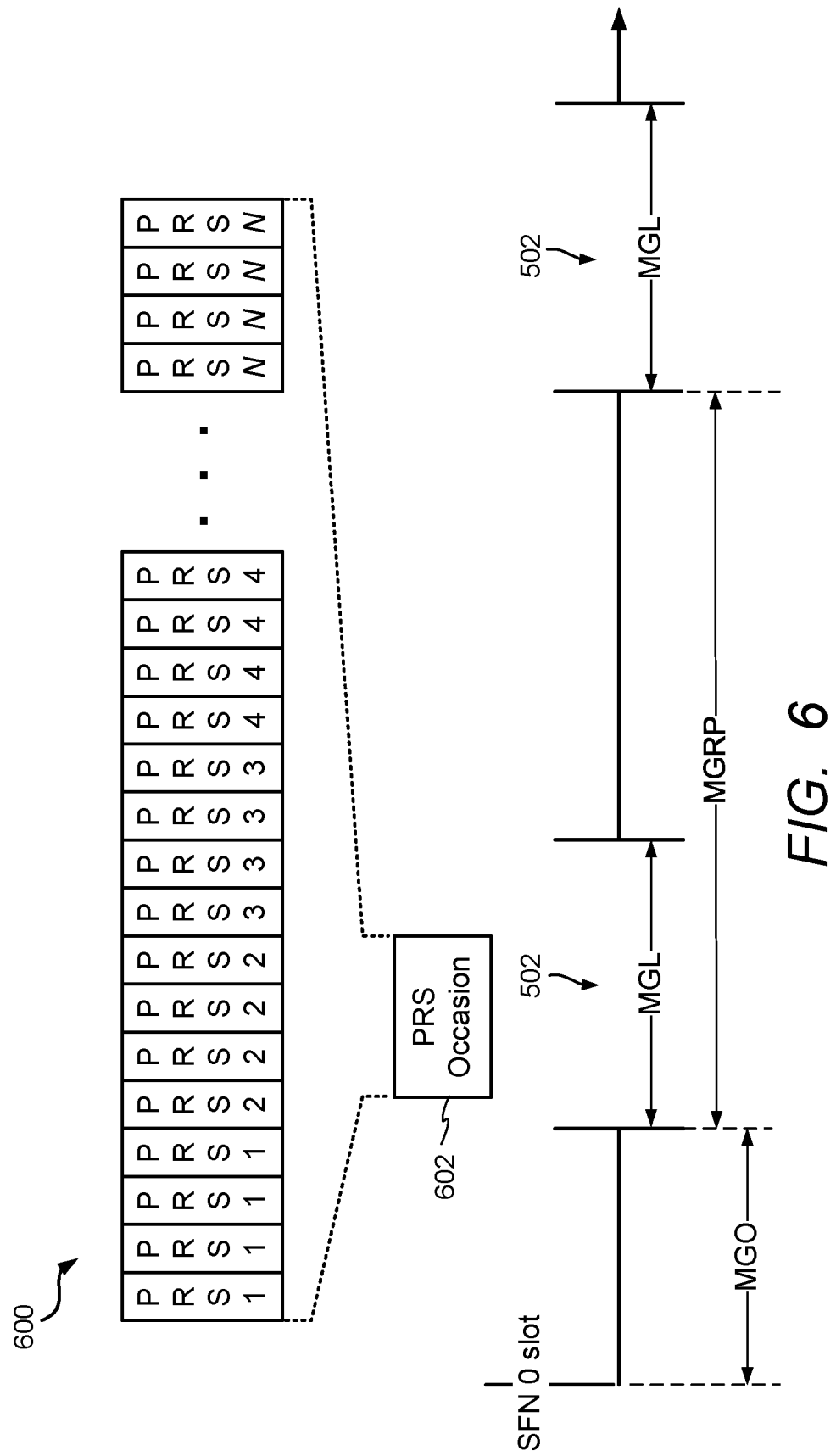
FIG. 6 is a diagram illustrating positioning reference signals (PRSs) within a PRS occasion within a measurement gap, according to aspects of the disclosure.

FIG. 6 is a diagram illustrating positioning reference signals 600, labeled $PRS_1$ through $PRS_N$, which are transmitted within a PRS occasion 602 within a measurement gap 502. $PRS_1$ is associated with one transmission/reception point (TRP), $PRS_2$ is associated with another TRP, and so on. In FIG. 6, each PRS is repeated four times and the transmission of the next PRS immediately follows in the time domain, e.g., the PRSs are "tightly packed" in the time domain. Each TRP can use the same beam pattern or different beam patterns for each repetition. In FIG. 6, PRSs are transmitted for the entire duration of the PRS occasion 602, and the PRS occasion 602 occupies only a portion of the measurement gap 502, but other configurations are also contemplated by the present disclosure. Up to 256 TRPs can be configured via assistance data, which means that a UE may need a longer measurement gap to measure the PRSs from all of them. These longer gaps are needed in a period manner for tracking use cases, and a longer gap will have an impact on NR throughput. In Third Generation Partnership Project (3GPP) release 17 (Rel17), there is a provision to use the tracking reference signal (TRS), which is a NR signal used for tracking, as a positioning signal. An example TRS configuration is shown in FIG. 7.

Figure 7:
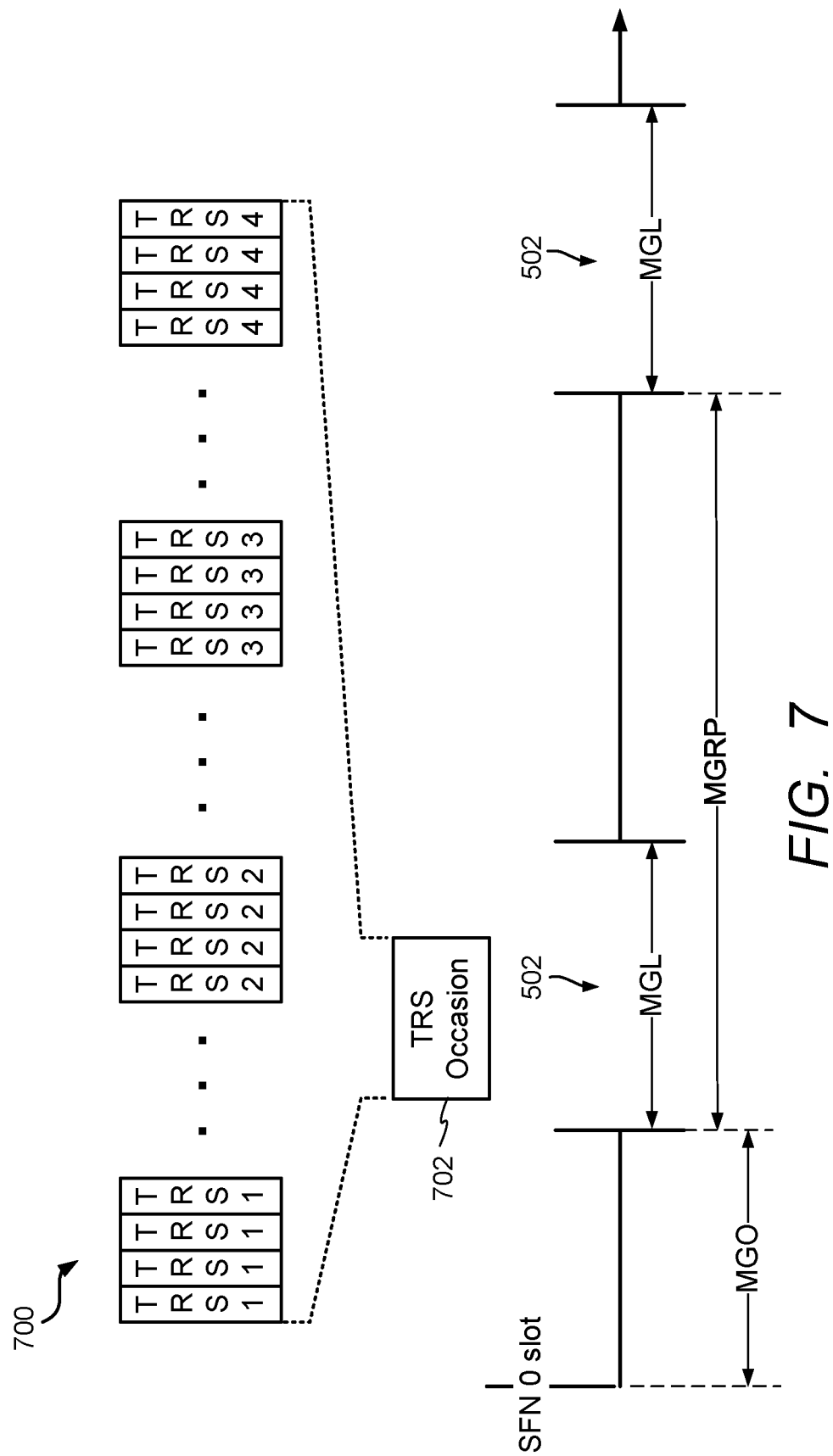
FIG. 7 is a diagram illustrating tracking reference signals (TRSs) within a TRS occasion within a measurement gap, according to aspects of the disclosure.

FIG. 7 is a diagram illustrating tracking reference signals 700, labeled $TRS_1$ through $TRS_4$, which are transmitted within a TRS occasion 702 within a measurement gap 502. $TRS_1$ is associated with one transmission/reception point (TRP), $TRS_2$ is associated with another TRP, and so on. FIG. 7 shows TRSs from four different cells, but other numbers of cells are also contemplated. TRSs can be used in a standalone fashion or jointly with a PRS. For a given slot, each TRS occupies four OFDM symbols, although different frequency offsets can be used across a symbol to make the TRS look like a 4-symbol comb-4 signal. TRSs from different cells will not be closely packed together, and each cell will have a different TRS offset. In FIG. 7, each TRS is repeated four times and the transmission of the next TRS does not immediately follow in the time domain, e.g., the TRSs are "sparsely packed" in the time domain. A UE will need a long measurement gap to measure the long TRS occasion 702.

Thus, one technical challenge for UEs operating in networks that support many PRSs or TRSs is that the corresponding PRS or TRS occasion must be long enough to cover that duration of time, which requires a measurement gap that is at least as that long. A long measurement gap, however, reduces NR throughput and increases power consumption by the UE.

To address these technical challenges, the following solution is presented—namely, to allow the configuration of multiple measurement gap (MG) configurations for each tracking session, and provide a mechanism by which a UE can dynamically change the size and/or location of the measurement gap. In some aspects, the size and/or location of the measurement gap may be set based on the characteristics of the PRS or TRS signals as measured by the UE. For example, the UE may narrow a measurement gap in order to focus on a few PRS and/or TRS signals that have high quality. Having a narrower measurement gap reduces the time that the UE must spend monitoring PRSs, which can result in lower power consumption and longer battery life for the UE, as well as allowing more time for data transmission, which increases throughput. For on-demand PRS, this solution can be used to improve the PRS overhead, e.g., by reducing the number of PRSs that the UE needs to decode in tracking mode. Another advantage is that the location server/gNB can stop scheduling PRSs outside of the requested MG, which will improve the overall system throughput. Yet another advantage is that when a base station provides the multiple MG configurations to a UE, those MG configurations may be broadcast or groupcast.

Figure 8:
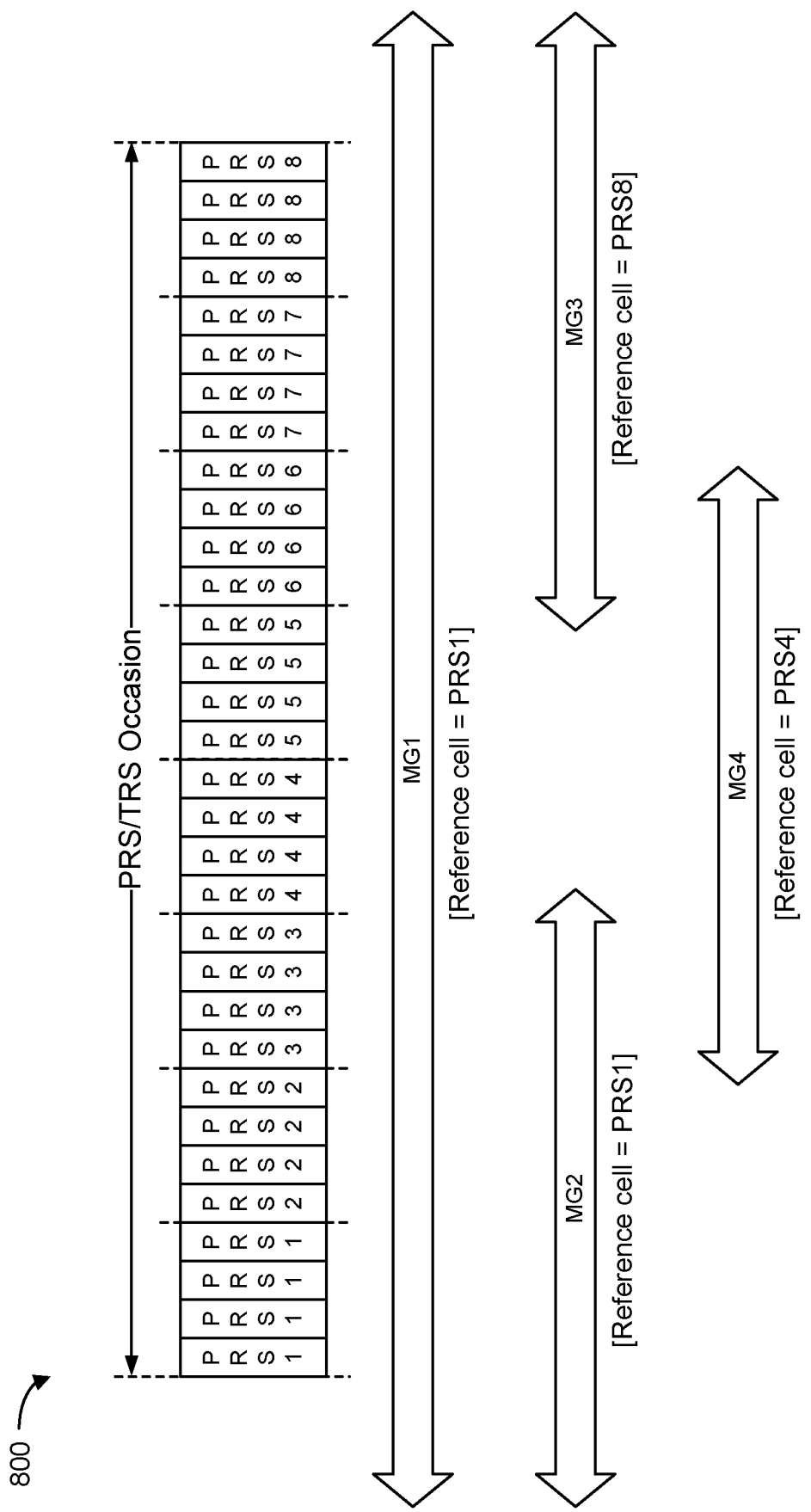
FIG. 8 illustrates an example of multiple measurement gaps according to aspects of the disclosure.

FIG. 8 illustrates an example of multiple measurement gaps according to some aspects. (It may be described as configuring multiple measurement gaps, or it may be described as having a configuration with multiple measurement gaps.) FIG. 8 shows a PRS/TRS occasion 800 containing a number of PRSs and/or TRSs, and four measurement gaps, labeled MG1, MG2, MG3, and MG4. Each measurement gap has a different combination of MGL and MGO values. Some MGs, such as MG1 and MG2, may have the same MGO value but different MGL values. Other MGS, such as MG2 and MG3, may have the same MGL value but different MGO values. In the example shown in FIG. 8, MG1 covers the entire PRS/TRS occasion 800 and more; MG2 covers PRS1 through PRS3, MG3 covers PRS6 through PRS8, and MG3 covers PRS3 through PRS 6. In some aspects, an MG may be associated with a reference cell for measurement reporting. For example, when MG1 is being used, the UE may send measurement reports to the cell associated with PRS1, but when MG3 is being used, PRS1 is not within the measurement gap, so the UE may send measurement reports to the cell associated with PRS8. FIG. 8 is illustrative and not limiting: therefore, the number, length, and offset of the various measurement gaps may vary and still remain within the scope of the concepts herein presented.

Figure 9A:
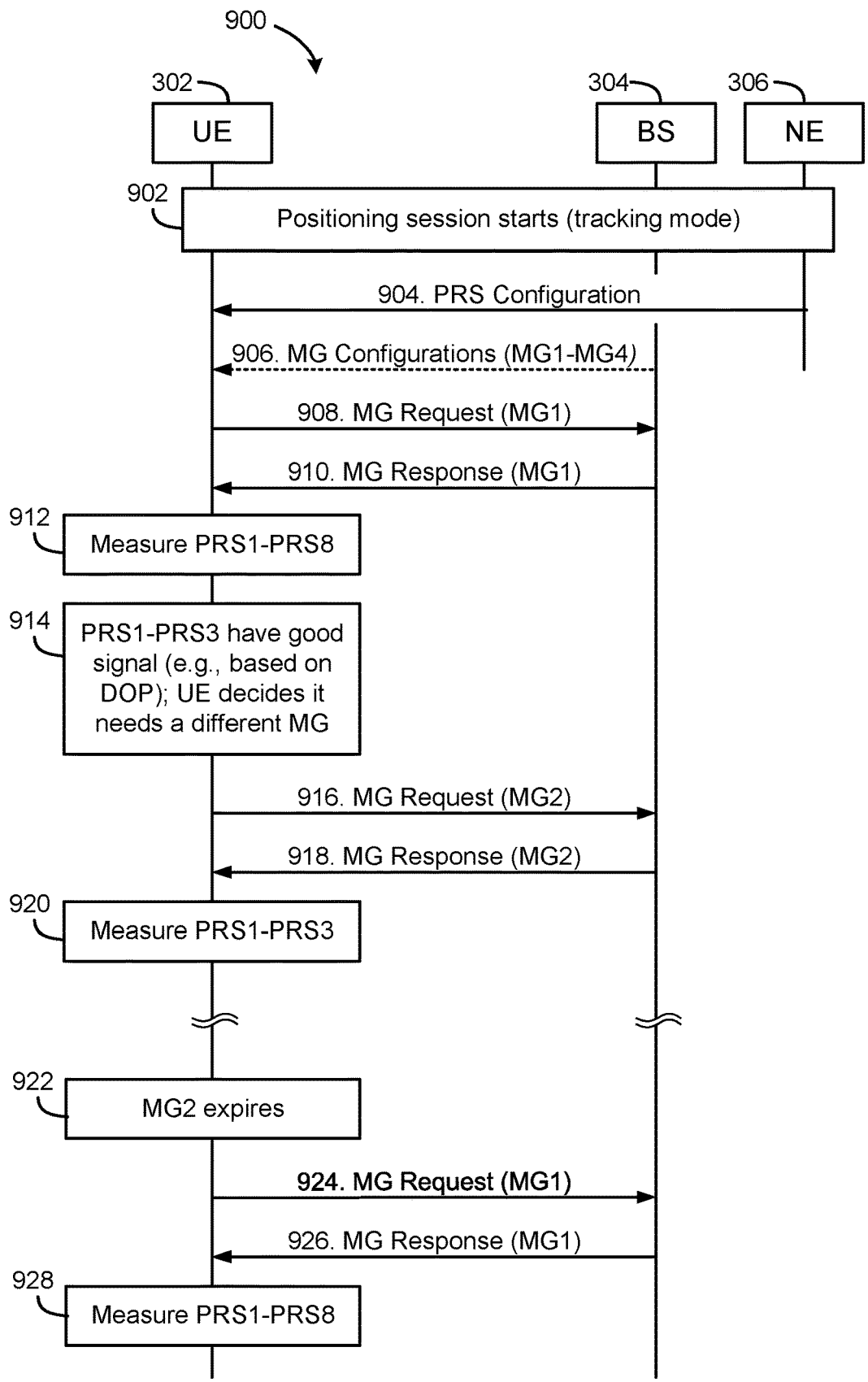
FIGS. 9A and 9B are signal messaging diagrams showing an exemplary method of wireless communication according to aspects of the disclosure.
Figure 9B:
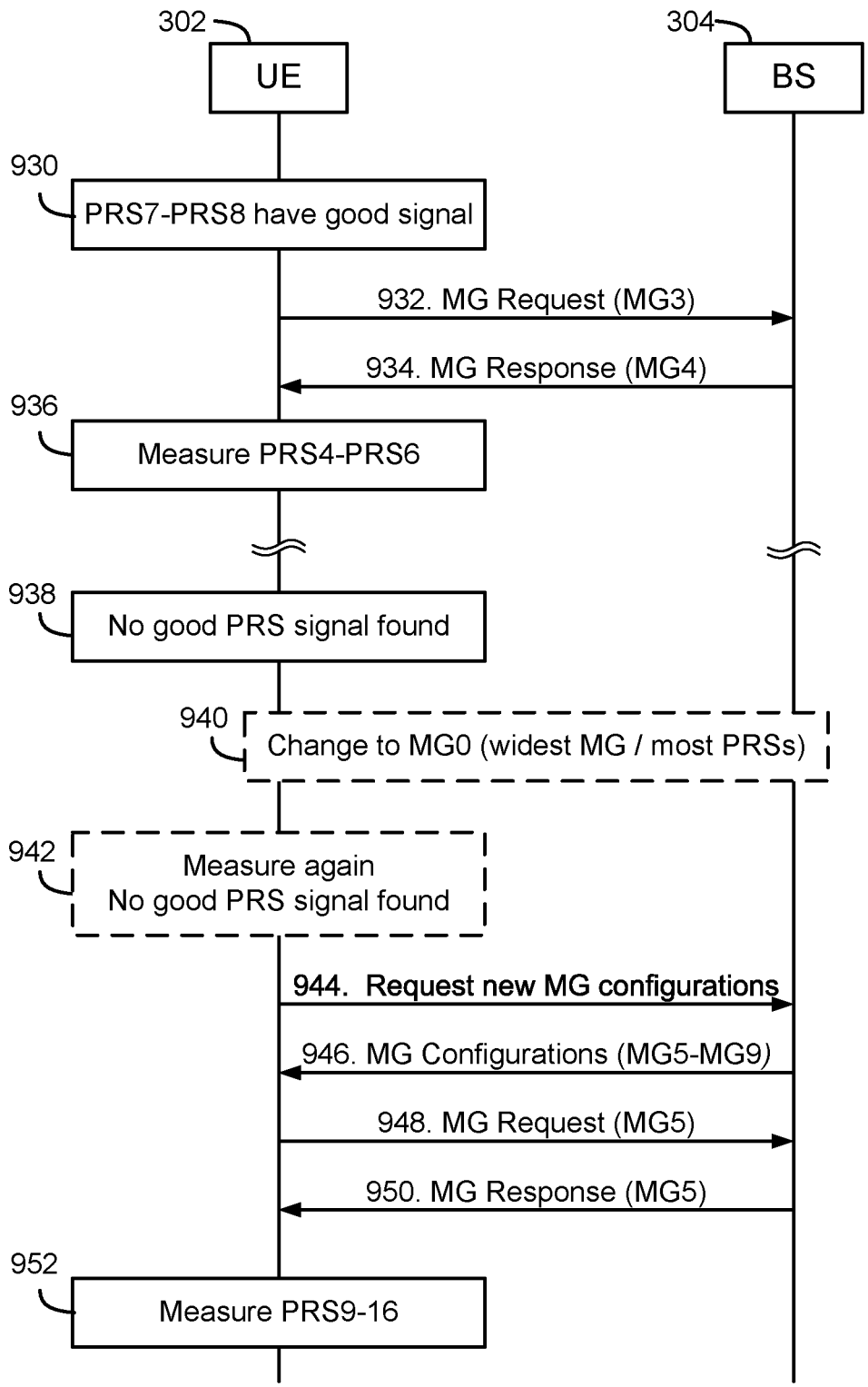

FIGS. 9A and 9B are signal messaging diagrams showing portions of an exemplary method 900 of wireless communication according to various aspects. FIGS. 9A and 9B show an interaction between a UE 302, a base station 304, and a network entity (NE) 306. In some aspects, the NE 306 may be an entity on a core network (such as, for example, core network 170), and in some aspects may be or include a location server 172.

In FIG. 9A, at 902, the UE 302, BS 304, and NE 306 start a positioning session, and at 904, the NE 306 provides the UE 302 with a PRS configuration. Optionally, at 906, the UE 302 is provided with multiple measurement gap (MG) configurations, labeled MG1, MG2, MG3, and so on. For the purposes of illustration, the measurement gap configurations MG1, MG2, MG3, and MG4 from FIG. 8 will be used. Although for simplicity of explanation the example illustrated in FIGS. 9A and 9B refers to PRSs, the same concepts may be applied to TRSs or to a combination of PRSs and TRSs. In some aspects, the multiple MG configurations may be broadcast or groupcast to multiple UEs.

At 908, the UE 302 sends, to the BS 304, a measurement gap request to use MG1, e.g., the UE 302 requests to use a measurement gap that spans all of the PRSs in the PRS occasion. At 910, the BS 304 sends an MG response indicating that the UE 302 should use MG1. In this exchange, the BS 304 lets the UE 302 use the requested MG configuration, but that is not always the case. At 912, the UE 302 measures $PRS_1$ through $PRS_8$, and at 914, the UE 302 determines that $PRS_1$ through $PRS_3$ have a good signal and that $PRS_4$ through PRS8 have a bad signal (or the UE 302 determines that $PRS_1$ through $PRS_3$ have a better signal than the other PRSs).

At 916, the UE 302 sends a measurement gap request to use MG2, e.g., the UE 302 requests to use a measurement gap that spans $PRS_1$ through $PRS_3$ and does not span $PRS_4$ through $PRS_8$. At 918, the BS 304 sends an MG response indicating that the UE 302 should use MG2. Starting at 920, the UE 302 measures $PRS_1$ through $PRS_3$ and does not measure $PRS_4$ through $PRS_8$. By measuring a subset of PRSs less that all of the PRSs in the PRS occasion, the UE 302 may reduce its power consumption and/or improve its throughput. The UE 302 continues using MG2 for as long as it is valid, e.g., until MG2 expires.

At 922, MG2 expires. MG2 may expire after a set duration of time has passed, after a threshold number of PRS measurements has been made, in response to some other trigger condition, or some combination of the above. In some aspects, when MG2 expires, the UE 302 returns to a default measurement gap configuration, such as MG1. Thus, in FIG. 9A, at 924, the UE 302 sends the BS 304 an MG request to use MG1, and at 926, the BS 304 grants that request. Starting from 928, the UE 302 again measures all of the PRSs in the PRS occasion, i.e., $PRS_1$ through $PRS_8$.

In the example illustrated in FIG. 9A, each MG may be associated with a timer that determines when to stop using that MG. In some aspects, a default MG may be associated with a timer that determines when to start or restart using the default MG, regardless of how long another measurement gap configuration has been active. In some aspects, this may be a periodic timer, may be triggered by some trigger event, or combinations thereof.

In FIG. 9B, at 930, the UE 302 determines that $PRS_7$ and $PRS_8$ have a better signal than the other PRSs (or have a signal while the other PRSs have no signal), and so at 932, the UE 302 sends the BS 304 an MG request to use MG3, i.e., the UE 302 will use a measurement gap that spans $PRS_7$ through PRS9 and does not span $PRS_1$ through $PRS_6$. At 934, the BS 304 responds with an indication that the UE 302 should use MG4, not MG3 as requested. Starting at 936, and continuing until MG4 expires, the UE 302 measures $PRS_4$ through $PRS_6$. FIG. 9B illustrates the point that the UE 302 may not always get the MG configuration that it requested.

Moreover, there may be times when the UE 302 finds that none of the available PRS signals are of acceptable signal quality. For example, at 938, the UE 302 finds no good PRS signal. In some aspects, the UE 302 may determine that it is not using the MG configuration having the best chance at detecting a good PRS, e.g., having the widest measuring gap or covering the largest number of PRSs, in which case at 940, the UE 302 may optionally negotiate with the base station 304 to change to the MG configuration having the best chance of detecting a good PRS, e.g., MG0 in this example. At 942, the UE 302 may optionally measure again with the changed MG configuration. In the example in FIG. 9B, the UE 302 still does not find a PRS signal of acceptable signal quality. Thus, at 944, the UE 302 may request a new set of MG configurations, and at 946, the BS 304 provides the UE 302 with a new set of MG configurations, i.e., at least one of the MG configurations in the new set is different from the configurations in the old set. In the example shown in FIG. 9B, the new MG configuration defines five new MGs, MG5 through MG9. In some aspects, the new MG configurations may be broadcast or groupcast to multiple UEs, e.g., to other UEs in the same area or that are also failing to find an acceptable PRS using their current MG configuration. At 948, the UE 302 sends the BS 304 an MG request to use one of the MGs, e.g., MG5, which may be the MG with the widest span, and at 950, the BS 304 approves this request. In the example illustrated in FIG. 9B, MG5 spans a new set of PRSs, e.g., PRS9 through PRS16. Alternatively, the new MG configuration may define different MGs that span different groups of existing PRSs rather than a new set of PRSs, or that span a mix of previously used PRSs and new PRSs. At 952, the UE 302 measures PRS9 through PRS16.

There are a number of metrics that the UE 302 may use to identify a good PRS. For example, a good PRS or TRS may be identified based on signal strength (e.g., RSRP, RSRP, SINR, etc.), based on the quality of the timing measurement of the PRS or TRS, and/or based on a dilution of precision (DOP) metric. For example, if a UE 302 measures only a subset of PRSs or TRSs that are geographically collocated or that otherwise do not provide sufficiently geographically disparate signals and thus reduce the precision of the location calculation, then the UE 302 may opt to not limit itself to measuring only that subset out of a concern that doing so would dilute the precision of this positioning activities.

Figure 10A:
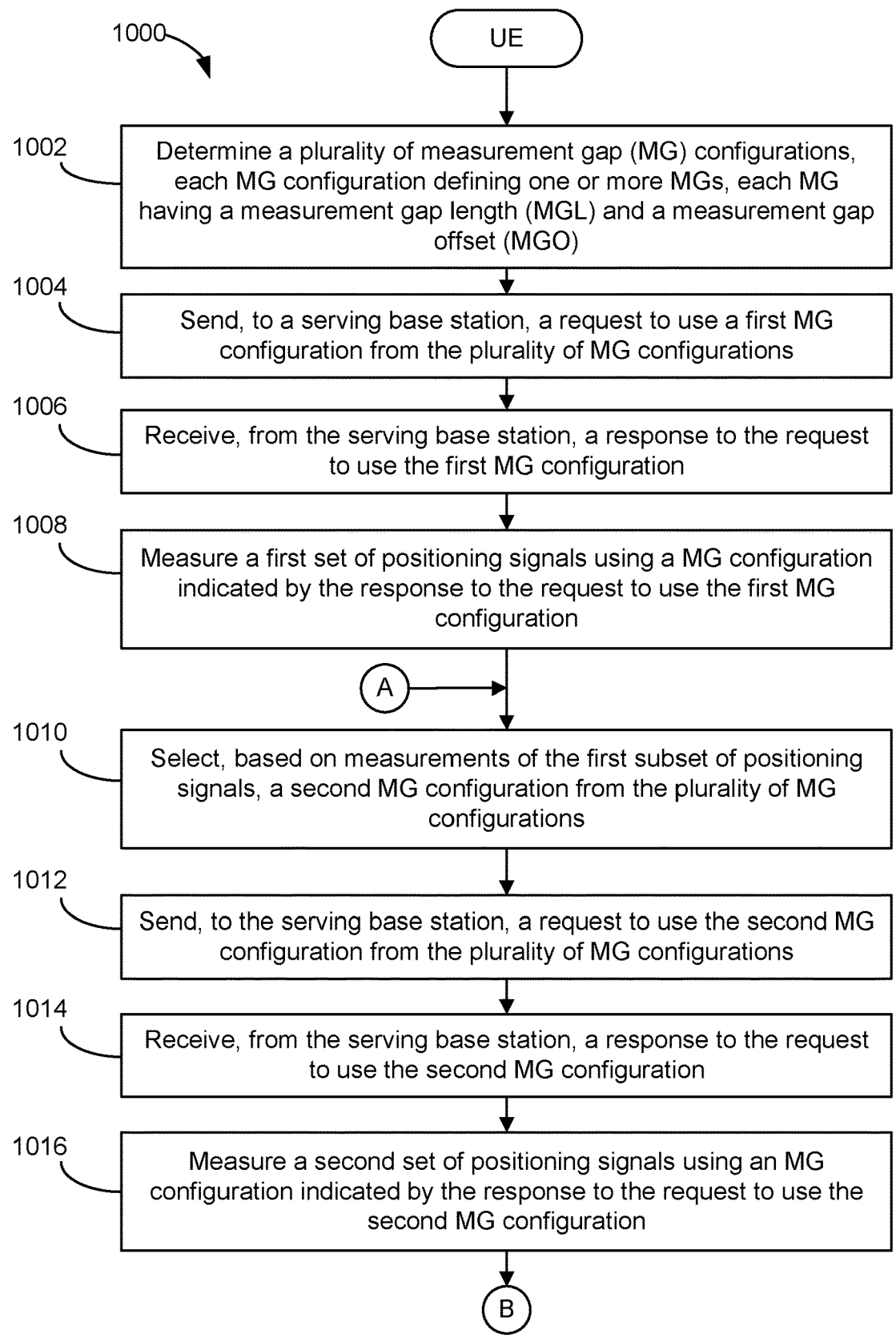
FIGS. 10A and 10B are flowcharts showing portions of an example process, performed by a UE, associated with dynamic configuration of measurement gaps according to aspects of the disclosure.
Figure 10B:
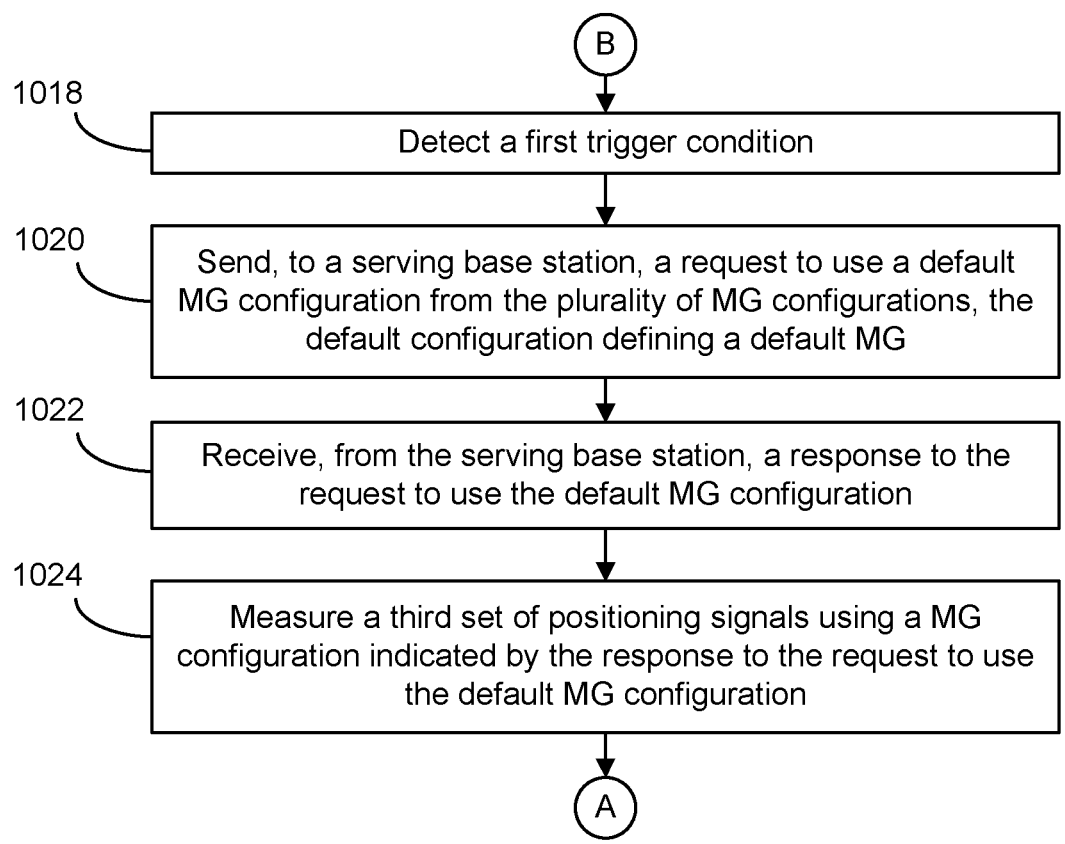

FIG. 10A and FIG. 10B are flowcharts showing portions of an example process 1000 associated with dynamic configuration of measurement gaps according to aspects of the disclosure. In some implementations, one or more process blocks of FIGS. 10A and 10B may be performed by a user equipment (UE) (e.g., UE 104). In some implementations, one or more process blocks of FIGS. 10A and 10B may be performed by another device or a group of devices separate from or including the UE. Additionally, or alternatively, one or more process blocks of FIGS. 10A and 10B may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 1000.

As shown in FIG. 10A, process 1000 may include determining a plurality of measurement gap (MG) configurations, each MG configuration defining one or more MGs, each MG having a measurement gap length (MGL) and a measurement gap offset (MGO) (block 1002). Means for performing the operation of block 1002 may include the processor(s) 332, memory 340, or WWAN transceiver(s) 310 of the UE 302. For example, in some aspects, determining the plurality of MG configurations comprises receiving the plurality of MG configurations from a base station, from a core network entity, such as an LMS or LMF, etc., via the receiver(s) 312. In some aspects, determining the plurality of MG configurations comprises receiving the plurality of MG configurations via RRC signaling.

As further shown in FIG. 10A, process 1000 may include sending, to a serving base station, a first request to use a first MG configuration from the plurality of MG configurations (block 1004). Means for performing the operation of block 1004 may include the processor(s) 332, memory 340, or WWAN transceiver(s) 310 of the UE 302. For example, the UE 302 may send the first request using the transmitter(s) 314.

As further shown in FIG. 10A, process 1000 may include receiving, from the serving base station or from a core network entity, such as an LMS or LMF, a response to the first request (block 1006). Means for performing the operation of block 1006 may include the processor(s) 332, memory 340, or WWAN transceiver(s) 310 of the UE 302. For example, the UE 302 may receive the response to the first request, using the receiver(s) 312. The response to the request will indicate the MG configuration that the UE should use. In some aspects, the MG configuration indicated by the response to the first request is the same as the first MG configuration or different from the first MG configuration. That is, the MG configuration that the UE should use may or may not be the MG configuration that the UE requested As further shown in FIG. 10A, process 1000 may include measuring a first set of positioning signals using an MG configuration indicated by the response to the first request (block 1008). Means for performing the operation of block 1008 may include the processor(s) 332, memory 340, or WWAN transceiver(s) 310 of the UE 302. For example, the UE may measure the first set of positioning signals using the receiver(s) 312.

As further shown in FIG. 10A, process 1000 may include selecting, based on measurements of the first set of positioning signals, a second MG configuration from the plurality of MG configurations (block 1010). Means for performing the operation of block 1010 may include the processor(s) 332, memory 340, or WWAN transceiver(s) 310 of the UE 302. For example, the UE 302 may select, based on measurements of the first set of positioning signals made by the receiver(s) 312, a second MG configuration from the plurality of MG configurations stored in memory 340, using processor(s) 332.

In some aspects, selecting the second MG configuration from the plurality of MG configurations based on the measurements of the first set of positioning signals comprises identifying, from the first set of positioning signals, a first subset of positioning signals based on a quality metric, and selecting the second MG configuration from the plurality of MG configurations based on the first subset of positioning signals. In some aspects, the quality metric comprises a reference signal received power (RSRP) value, a reference signal received quality (RSRQ) value, a signal to interference plus noise (SINR) value, a quality of a timing measurement, a dilution of precision metric, or various combinations thereof.

In some aspects, the first subset of positioning signals satisfy a quality metric, and selecting the second MG configuration based on the first subset of positioning signals comprises selecting an MG configuration having an MG that includes the first subset of positioning signals. In some aspects, selecting the MG configuration having the MG that includes the first subset of positioning signals comprises selecting an MG configuration having the smallest MG that includes the first subset of positioning signals.

In some aspects, the first subset of positioning signals fail to satisfy a quality metric, and selecting the second MG configuration based on the first subset of positioning signals comprises selecting an MG configuration having an MG that excludes the first subset of positioning signals. In some aspects, selecting the MG configuration having the MG that excludes the first subset of positioning signals comprises selecting an MG configuration having the largest MG that excludes the first subset of positioning signals.

As further shown in FIG. 10A, process 1000 may include sending, to the serving base station, a second request to use the second MG configuration from the plurality of MG configurations (block 1012). Means for performing the operation of block 1012 may include the processor(s) 332, memory 340, or WWAN transceiver(s) 310 of the UE 302. For example, the UE may send the second request using the transmitter(s) 314. In some aspects, the second MG configuration indicates a reference cell for measurement reporting, and the method further comprises sending a measurement report to the reference cell indicated by the second MG configuration. In the example shown in FIG. 8, when MG configuration MG4 is selected, the UE may send measurement reports to the cell associated with PRS4 instead of to the default cell, which in this example is the cell associated with PRS1.

As further shown in FIG. 10A, process 1000 may include receiving, from the serving base station, a response to the second request (block 1014). Means for performing the operation of block 1014 may include the processor(s) 332, memory 340, or WWAN transceiver(s) 310 of the UE 302. For example, the UE 302 may receive the response to the second request using the receiver(s) 312. In some aspects, the MG configuration indicated by the response to the second request is the same as the second MG configuration or different from the second MG configuration. That is the MG configuration to be used by the UE may or may not be the second MG configuration that the UE requested.

As further shown in FIG. 10A, process 1000 may include measuring a second set of positioning signals using an MG configuration indicated by the response to the second request (block 1016). Means for performing the operation of block 1016 may include the processor(s) 332, memory 340, or WWAN transceiver(s) 310 of the UE 302. For example, the UE 302 may measure the second set of positioning signals using the receiver(s) 312.

In some aspects, at least one positioning signal within at least one of the first set of positioning signals or the second set of positioning signals comprises a positioning reference signal (PRS) or a tracking reference signal (TRS).

As shown in FIG. 10B, in some aspects, process 1000 may further include detecting a first trigger condition (block 1018). Means for performing the operation of block 1018 may include the processor(s) 332, memory 340, or WWAN transceiver(s) 310 of the UE 302. For example the UE 302 may detect an internal trigger condition using the processor(s) 332, or may detect an external trigger condition using the receiver(s) 312. In some aspects, detecting the first trigger condition comprises detecting that a time limit for using the second MG configuration has expired, detecting that a threshold number of measurements using the second MG configuration has been satisfied, or receiving an instruction to stop using the second MG configuration.

As further shown in FIG. 10B, process 1000 may further include sending, to the serving base station, a request to use a default MG configuration from the plurality of MG configurations, the default MG configuration defining a default MG (block 1020). Means for performing the operation of block 1020 may include the processor(s) 332, memory 340, or WWAN transceiver(s) 310 of the UE 302. For example, the UE may send the request using the transmitter(s) 314.

As further shown in FIG. 10B, process 1000 may further include receiving, from the serving base station, a response to the request to use the default MG configuration (block 1022). Means for performing the operation of block 1022 may include the processor(s) 332, memory 340, or WWAN transceiver(s) 310 of the UE 302. For example, the UE 302 may receive the response using the receiver(s) 312.

As further shown in FIG. 10B, process 1000 may further include measuring a third set of positioning signals using an MG configuration indicated by the response to the request to use the default MG configuration (block 1024). Means for performing the operation of block 1024 may include the processor(s) 332, memory 340, or WWAN transceiver(s) 310 of the UE 302. For example, the UE 302 may measure the third set of positioning signals using the receiver(s) 312. In some aspects, the default MG configuration comprises the first MG configuration, the default MG comprises the first MG, and the third set of positioning signals comprises the first set of positioning signals.

The process of identifying a subset of positioning signals, selecting an MG that covers just those positioning signals, and using that MG until instructed to return to a default MG, may be repeated indefinitely, e.g., by returning to point A in the flowchart in FIG. 10A.

Process 1000 may include additional implementations, such as any single implementation or any combination of implementations described below and/or in connection with one or more other processes described elsewhere herein. Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11A:
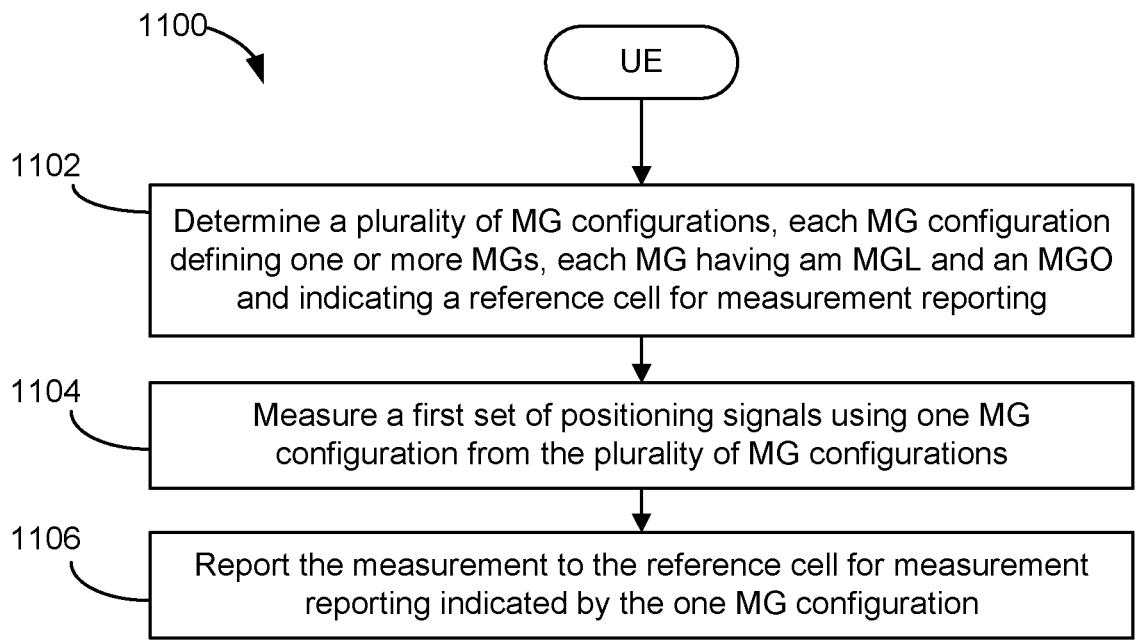
FIGS. 11A through 11C are flowcharts showing portions of an example process, performed by a UE, associated with dynamic configuration of measurement gaps according to aspects of the disclosure.
Figure 11B:
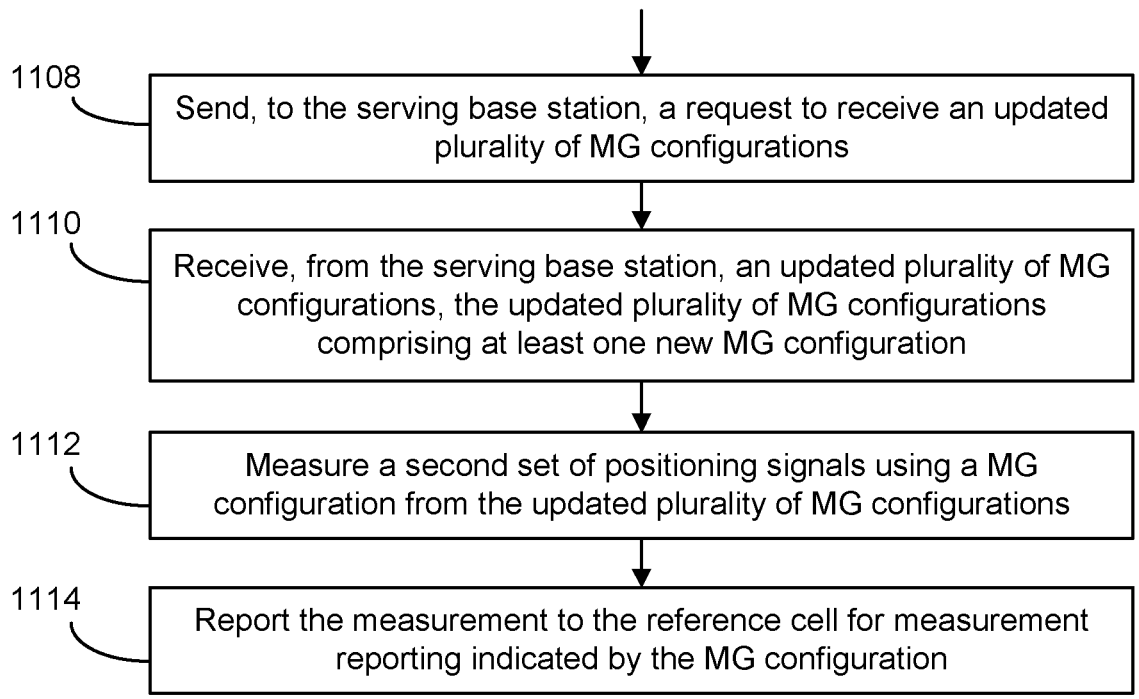
Figure 11C:
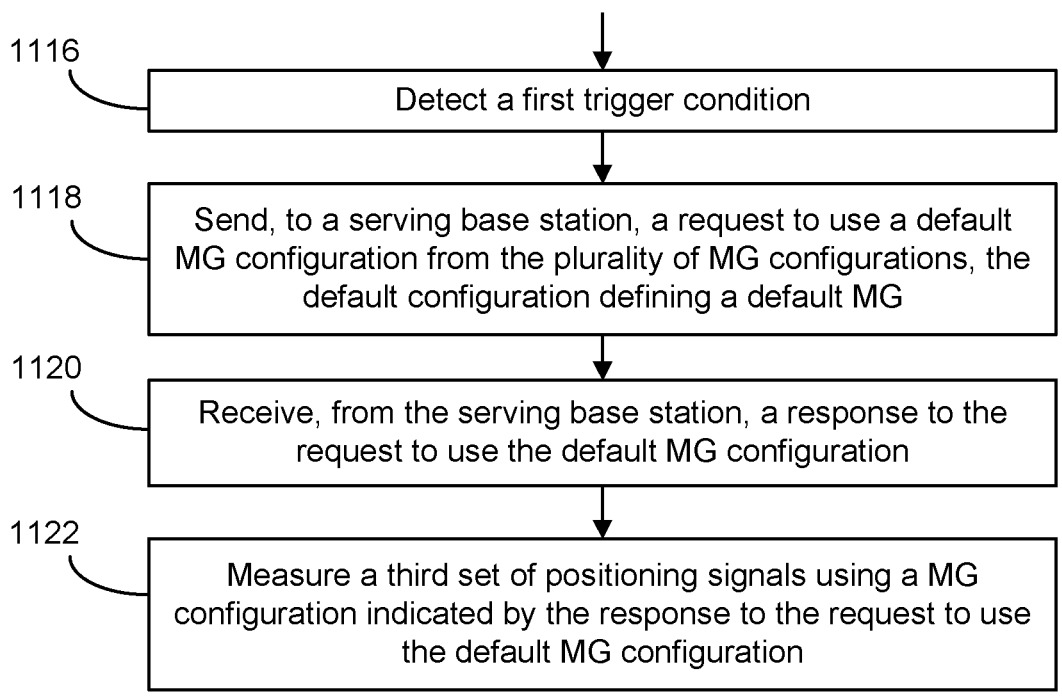

FIG. 11A, FIG. 11B, and FIG. 11C are flowcharts showing portions of an example process 1100 associated with dynamic configuration of measurement gaps according to aspects of the disclosure. In some implementations, one or more process blocks of FIGS. 11A through 11C may be performed by a UE (e.g., UE 104). In some implementations, one or more process blocks of FIGS. 11A through 11C may be performed by another device or a group of devices separate from or including the UE. Additionally, or alternatively, one or more process blocks of FIGS. 11A through 11C may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 1100.

As shown in FIG. 11A, process 1100 may include determining a plurality of measurement gap (MG) configurations, each MG configuration defining one or more MGs, each MG having a measurement gap length (MGL) and a measurement gap offset (MGO) and indicating a reference cell for measurement reporting (block 1102). Means for performing the operation of block 1102 may include the processor(s) 332, memory 340, or WWAN transceiver(s) 310 of the UE 302. For example, in some aspects, determining the plurality of MG configurations comprises receiving the plurality of MG configurations from a base station, from a core network entity, such as an LMS or LMF, etc., via the receiver(s) 312. In some aspects, determining the plurality of MG configurations comprises receiving the plurality of MG configurations via RRC signaling.

As further shown in FIG. 11A, process 1100 may include measuring a first set of positioning signals using one MG configuration from the plurality of MG configurations (block 1104). Means for performing the operation of block 1104 may include the processor(s) 332, memory 340, or WWAN transceiver(s) 310 of the UE 302. For example, the UE 302 may measure the first set of positioning signals using the receiver(s) 312.

As further shown in FIG. 11A, process 1100 may include reporting the measurement to the reference cell for measurement reporting indicated by the one MG configuration (block 1106). Means for performing the operation of block 1106 may include the processor(s) 332, memory 340, or WWAN transceiver(s) 310 of the UE 302. For example, the UE 302 may report the measurement using the transmitter(s) 314.

As shown in FIG. 11B, in some aspects, process 1100 may further include sending, to a serving base station, a second request to use a second MG configuration from the plurality of MG configurations (block 1108). Means for performing the operation of block 1108 may include the processor(s) 332, memory 340, or WWAN transceiver(s) 310 of the UE 302. For example, the UE 302 may send the second request using the transmitter(s) 314.

In some aspects, sending the second request comprises selecting the second MG configuration from the plurality of MG configurations based on measurements of the first set of positioning signals.

In some aspects, selecting the second MG configuration from the plurality of MG configurations based on the measurements of the first set of positioning signals comprises identifying, from the first set of positioning signals, a first subset of positioning signals based on a quality metric, and selecting the second MG configuration from the plurality of MG configurations based on the first subset of positioning signals.

In some aspects, the quality metric comprises a reference signal received power (RSRP) value, a reference signal received quality (RSRQ) value, a signal to interference plus noise (SINR) value, a quality of a timing measurement, a dilution of precision metric, or various combinations thereof.

In some aspects, the first subset of positioning signals satisfy a quality metric and wherein selecting the second MG configuration based on the first subset of positioning signals comprises selecting an MG configuration having an MG that includes the first subset of positioning signals.

In some aspects, selecting the MG configuration having the MG that includes the first subset of positioning signals comprises selecting an MG configuration having the smallest MG that includes the first subset of positioning signals.

In some aspects, the first subset of positioning signals fail to satisfy a quality metric and wherein selecting the second MG configuration based on the first subset of positioning signals comprises selecting an MG configuration having an MG that excludes the first subset of positioning signals.

In some aspects, selecting the MG configuration having the MG that excludes the first subset of positioning signals comprises selecting an MG configuration having the largest MG that excludes the first subset of positioning signals.

As further shown in FIG. 11B, process 1100 may include receiving, from the serving base station, a response to the second request (block 1110). Means for performing the operation of block 1110 may include the processor(s) 332, memory 340, or WWAN transceiver(s) 310 of the UE 302. For example, the UE 302 may receive the response to the second request using the receiver(s) 312.

As further shown in FIG. 11B, process 1100 may include measuring a second set of positioning signals using an MG configuration indicated by the response to the second request (block 1112). Means for performing the operation of block 1112 may include the processor(s) 332, memory 340, or WWAN transceiver(s) 310 of the UE 302. For example, the UE 302 may measure the second set of positioning signals using the receiver(s) 312.

As further shown in FIG. 11B, process 1100 may include reporting the measurement to the reference cell for measurement reporting indicated by the MG configuration indicated by the response to the second request (block 1114). Means for performing the operation of block 1114 may include the processor(s) 332, memory 340, or WWAN transceiver(s) 310 of the UE 302. For example, the UE 302 may report the measurement using the transmitter(s) 314.

In some aspects, one MG configuration of the plurality of MG configurations is identified as a default MG configuration.

As shown in FIG. 11C, in some aspects, process 1100 may further include detecting a first trigger condition (block 1116). Means for performing the operation of block 1116 may include the processor(s) 332, memory 340, or WWAN transceiver(s) 310 of the UE 302. For example the UE 302 may detect an internal trigger condition using the processor(s) 332, or may detect an external trigger condition using the receiver(s) 312. In some aspects, detecting the first trigger condition comprises detecting that a time limit for using the second MG configuration has expired, detecting that a threshold number of measurements using the second MG configuration has been satisfied, or receiving an instruction to stop using the second MG configuration.

As further shown in FIG. 11C, process 1100 may further include sending, to the serving base station, a request to use a default MG configuration from the plurality of MG configurations, the default MG configuration defining a default MG (block 1118). Means for performing the operation of block 1118 may include the processor(s) 332, memory 340, or WWAN transceiver(s) 310 of the UE 302. For example, the UE may send the request using the transmitter(s) 314.

As further shown in FIG. 11C, process 1100 may further include receiving, from the serving base station, a response to the request to use the default MG configuration (block 1120). Means for performing the operation of block 1120 may include the processor(s) 332, memory 340, or WWAN transceiver(s) 310 of the UE 302. For example, the UE 302 may receive the response using the receiver(s) 312.

As further shown in FIG. 11C, process 1100 may further include measuring a third set of positioning signals using an MG configuration indicated by the response to the request to use the default MG configuration (block 1122). Means for performing the operation of block 1122 may include the processor(s) 332, memory 340, or WWAN transceiver(s) 310 of the UE 302. For example, the UE 302 may measure the third set of positioning signals using the receiver(s) 312. In some aspects, the default MG configuration comprises the first MG configuration, the default MG comprises the first MG, and the third set of positioning signals comprises the first set of positioning signals.

Process 1100 may include additional implementations, such as any single implementation or any combination of implementations described below and/or in connection with one or more other processes described elsewhere herein. Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
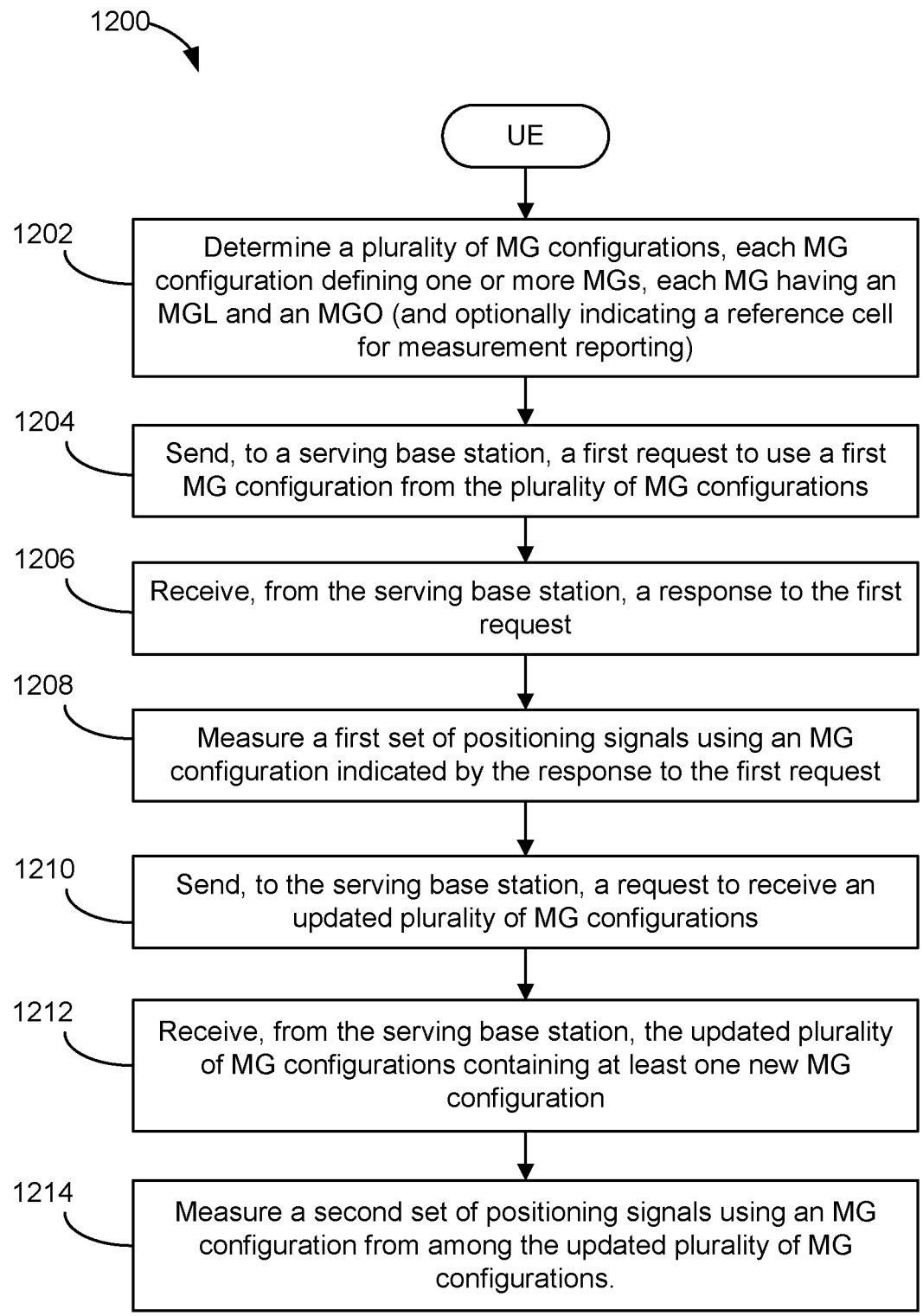
FIG. 12 is a flowchart showing a portion of an example process, performed by a UE, associated with dynamic configuration of measurement gaps according to aspects of the disclosure.

FIG. 12 is a flowchart of an example process 1200 associated with dynamic configuration of measurement gaps according to aspects of the disclosure. In some implementations, one or more process blocks of FIG. 12 may be performed by a user equipment (UE) (e.g., UE 104). In some implementations, one or more process blocks of FIG. 12 may be performed by another device or a group of devices separate from or including the UE. Additionally, or alternatively, one or more process blocks of FIG. 12 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of process 1200.

As shown in FIG. 12, process 1200 may include determining a plurality of MG configurations, each MG configuration defining one or more MGs, each MG having an MGL and an MGO, and optionally, indicating a reference cell for measurement reporting (block 1202). Means for performing the operation of block 1202 may include the processor(s) 332, memory 340, or WWAN transceiver(s) 310 of the UE 302. For example, in some aspects, determining the plurality of MG configurations comprises receiving the plurality of MG configurations from a base station, from a core network entity, such as an LMS or LMF, etc., via the receiver(s) 312. In some aspects, determining the plurality of MG configurations comprises receiving the plurality of MG configurations via RRC signaling.

As further shown in FIG. 12, process 1200 may include sending, to a serving base station, a first request to use a first MG configuration from the plurality of MG configurations (block 1204). Means for performing the operation of block 1204 may include the processor(s) 332, memory 340, or WWAN transceiver(s) 310 of the UE 302. For example, the UE 302 may send the first request using the transmitter(s) 314.

As further shown in FIG. 12, process 1200 may include receiving, from the serving base station, a response to the first request (block 1206). Means for performing the operation of block 1206 may include the processor(s) 332, memory 340, or WWAN transceiver(s) 310 of the UE 302. For example, the UE 302 may receive the response to the first request using the receiver(s) 312.

As further shown in FIG. 12, process 1200 may include measuring a first set of positioning signals using an MG configuration indicated by the response to the first request (block 1208). Means for performing the operation of block 1208 may include the processor(s) 332, memory 340, or WWAN transceiver(s) 310 of the UE 302. For example, the UE 302 may measure the first set of positioning signals using the receiver(s) 312.

As further shown in FIG. 12, process 1200 may include sending, to the serving base station, a request to receive an updated plurality of MG configurations (block 1210). Means for performing the operation of block 1210 may include the processor(s) 332, memory 340, or WWAN transceiver(s) 310 of the UE 302. For example, the UE 302 may send the request to receive an updated plurality of MG configurations using the transmitter(s) 314. In some aspects, sending the request to receive the updated plurality of MG configurations comprises sending the request in response to determining that no positioning signal in the first set of positioning signals meets a minimum quality standard.

As further shown in FIG. 12, process 1200 may include receiving, from the serving base station, the updated plurality of MG configurations, the updated plurality of MG configurations comprising at least one new MG configuration (block 1212). Means for performing the operation of block 1212 may include the processor(s) 332, memory 340, or WWAN transceiver(s) 310 of the UE 302. For example, the UE 302 may receive the updated plurality of MG configurations using the receiver(s) 312.

As further shown in FIG. 12, process 1200 may include measuring a second set of positioning signals using an MG configuration from among the updated plurality of MG configurations (block 1214). Means for performing the operation of block 1214 may include the processor(s) 332, memory 340, or WWAN transceiver(s) 310 of the UE 302. For example, the UE 302 may measure the second set of positioning signals using the receiver(s) 312.

Process 1200 may include additional implementations, such as any single implementation or any combination of implementations described below and/or in connection with one or more other processes described elsewhere herein.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
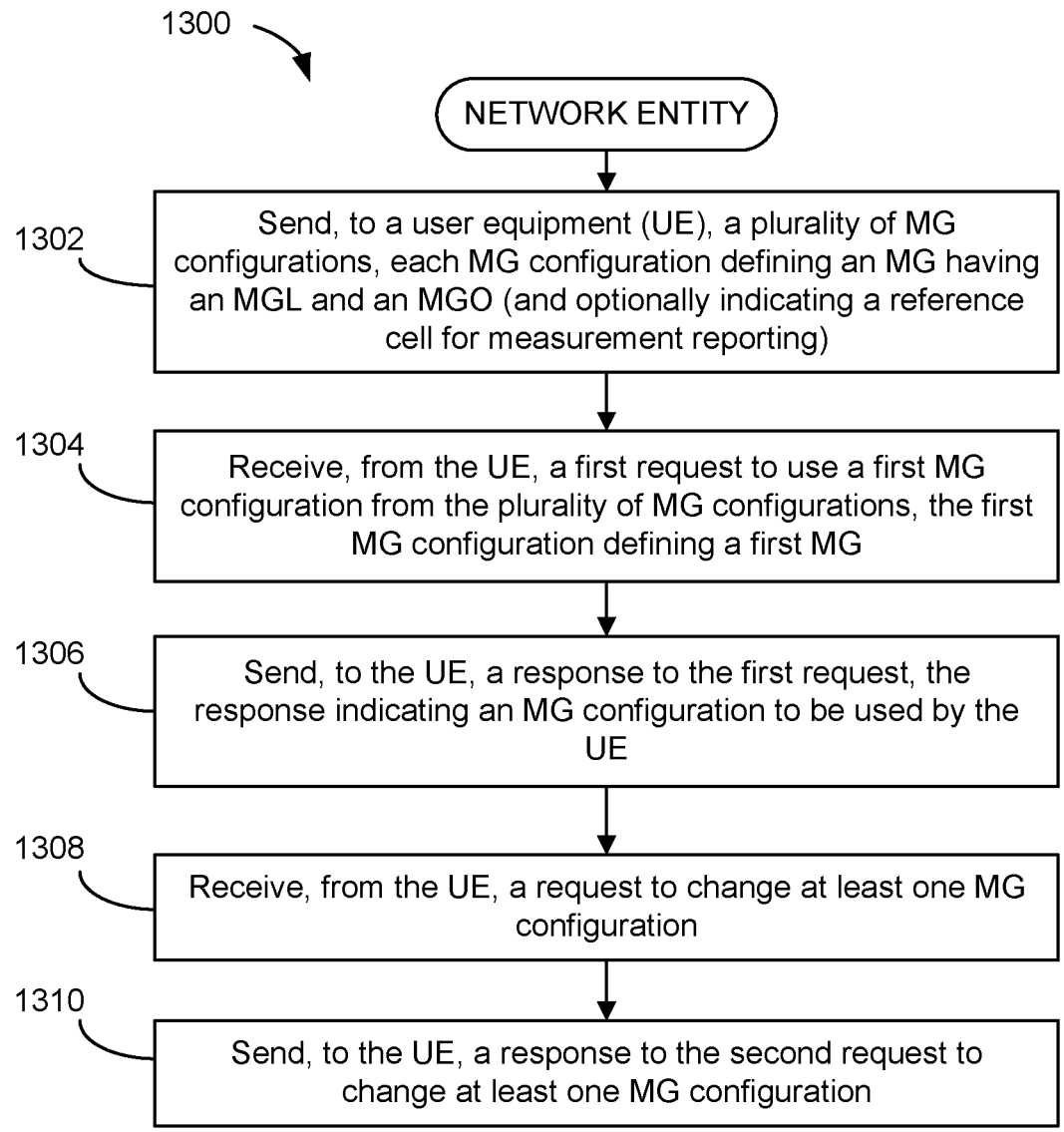
FIG. 13 is a flowchart showing a portion of an example process, performed by a network entity, associated with dynamic configuration of measurement gaps according to aspects of the disclosure.

FIG. 13 is a flowchart of an example process 1300 associated with dynamic configuration of measurement gaps according to aspects of the disclosure. In some implementations, one or more process blocks of FIG. 13 may be performed by a network entity (e.g., a location server 172, an LMF 270, etc.). In some implementations, one or more process blocks of FIG. 13 may be performed by another device or a group of devices separate from or including the network entity. Additionally, or alternatively, one or more process blocks of FIG. 13 may be performed by one or more components of network entity 306, such as processor(s) 394, memory 396, network transceiver(s) 390, and positioning component(s) 398, any or all of which may be means for performing the operations of process 1300.

As shown in FIG. 13, process 1300 may include sending, to a user equipment (UE), a plurality of measurement gap (MG) configurations, each MG configuration defining an MG having a measurement gap length (MGL) and a measurement gap offset (MGO) (block 1302). Means for performing the operation of block 1302 may include the processor(s) 394, memory 396, or network transceiver(s) 390 of the network entity 306. For example, the network entity 306 may send the plurality of measurement gap (MG) configuration using the network transceiver(s) 390. In some aspects, each MG configuration in the plurality of MG configurations indicates a reference cell for measurement reporting. In some aspects, one MG configuration in the plurality of MG configurations is identified as a default MG configuration.

As further shown in FIG. 13, process 1300 may include receiving, from the UE, a first request to use a first MG configuration from the plurality of MG configurations (block 1304). Means for performing the operation of block 1304 may include the processor(s) 394, memory 396, or network transceiver(s) 390 of the network entity 306. For example, the network entity 306 may receive the first request using the network transceiver(s) 390.

As further shown in FIG. 13, process 1300 may include sending, to the UE, a response to the first request, indicating an MG configuration to be used by the UE (block 1306). Means for performing the operation of block 1306 may include the processor(s) 394, memory 396, or network transceiver(s) 390 of the network entity 306. For example, the network entity 306 may send the response to the first request using the network transceiver(s) 390.

As further shown in FIG. 13, process 1300 may include receiving, from the UE, a second request to change at least one MG configuration (block 1308). Means for performing the operation of block 1308 may include the processor(s) 394, memory 396, or network transceiver(s) 390 of the network entity 306. For example, the network entity 306 may receive the second request using the network transceiver(s) 390.

As further shown in FIG. 13, process 1300 may include sending, to the UE, a response to the second request to change to at least one MG configuration (block 1310). Means for performing the operation of block 1310 may include the processor(s) 394, memory 396, or network transceiver(s) 390 of the network entity 306. For example, the network entity 306 may send the response to the second request using the network transceiver(s) 390.

In some aspects, receiving the second request comprises receiving a request to use a second MG configuration from the plurality of MG configurations, and sending the response to the second request comprises sending an indication identifying an MG configuration from the plurality of MG configurations to be used by the UE. In some aspects, the MG configuration indicated by the response to the second request is the same as the second MG configuration or different from the second MG configuration.

In some aspects, receiving the second request comprises receiving a request to receive an updated plurality of MG configurations, and wherein sending the response to the second request comprises sending the updated plurality of MG configurations, the updated plurality of MG configurations comprising at least one new MG configuration.

In some aspects, the network entity comprises a base station or a core network entity. In some aspects, the network entity comprises a core network entity. In some aspects, the core network entity comprises a location management server (LMS) or a location management function (LMF).

Process 1300 may include additional implementations, such as any single implementation or any combination of implementations described below and/or in connection with one or more other processes described elsewhere herein. Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), the method comprising: determining a plurality of measurement gap (MG) configurations, each MG configuration defining one or more MGs, each MG having a measurement gap length (MGL) and a measurement gap offset (MGO); sending, to a serving base station, a first request to use a first MG configuration from the plurality of MG configurations; receiving, from the serving base station, a response to the first request; measuring a first set of positioning signals using an MG configuration indicated by the response to the first request; selecting, based on measurements of the first set of positioning signals, a second MG configuration from the plurality of MG configurations; sending, to the serving base station, a second request to use the second MG configuration from the plurality of MG configurations; receiving, from the serving base station, a response to the second request; and measuring a second set of positioning signals using an MG configuration indicated by the response to the second request.

Clause 2. The method of clause 1, wherein the second MG configuration indicates a reference cell for measurement reporting and wherein the method further comprises sending a measurement report to the reference cell indicated by the second MG configuration.

Clause 3. The method of any of clauses 1 to 2, wherein determining the plurality of MG configurations comprises receiving the plurality of MG configurations from a base station, from a core network entity, from a location management server (LMS), or from location management function (LMF).

Clause 4. The method of any of clauses 1 to 3, wherein determining the plurality of MG configurations comprises receiving the plurality of MG configurations via radio resource control (RRC) signaling.

Clause 5. The method of any of clauses 1 to 4, wherein the MG configuration indicated by the response to the first request is the same as the first MG configuration or different from the first MG configuration.

Clause 6. The method of any of clauses 1 to 5, wherein the MG configuration indicated by the response to the second request is the same as the second MG configuration or different from the second MG configuration.

Clause 7. The method of any of clauses 1 to 6, wherein at least one positioning signal within at least one of the first set of positioning signals or the second set of positioning signals comprises a positioning reference signal (PRS) or a tracking reference signal (TRS).

Clause 8. The method of any of clauses 1 to 7, wherein selecting the second MG configuration from the plurality of MG configurations based on the measurements of the first set of positioning signals comprises: identifying, from the first set of positioning signals, a first subset of positioning signals based on a quality metric; and selecting the second MG configuration from the plurality of MG configurations based on the first subset of positioning signals.

Clause 9. The method of clause 8, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

Clause 10. The method of any of clauses 8 to 9, wherein the first subset of positioning signals satisfy a quality metric and wherein selecting the second MG configuration based on the first subset of positioning signals comprises selecting an MG configuration having an MG that includes the first subset of positioning signals.

Clause 11. The method of clause 10, wherein selecting the MG configuration having the MG that includes the first subset of positioning signals comprises selecting an MG configuration having the smallest MG that includes the first subset of positioning signals.

Clause 12. The method of any of clauses 8 to 11, wherein the first subset of positioning signals fail to satisfy a quality metric and wherein selecting the second MG configuration based on the first subset of positioning signals comprises selecting an MG configuration having an MG that excludes the first subset of positioning signals.

Clause 13. The method of clause 12, wherein selecting the MG configuration having the MG that excludes the first subset of positioning signals comprises selecting an MG configuration having the largest MG that excludes the first subset of positioning signals.

Clause 14. The method of any of clauses 1 to 13, further comprising: detecting a first trigger condition; sending, to the serving base station, a request to use a default MG configuration from the plurality of MG configurations, the default MG configuration defining a default MG; receiving, from the serving base station, a response to the request to use the default MG configuration; and measuring a third set of positioning signals using an MG configuration indicated by the response to the request to use the default MG configuration.

Clause 15. The method of clause 14, wherein detecting the first trigger condition comprises: detecting that a time limit for using the second MG configuration has expired; detecting that a threshold number of measurements using the second MG configuration has been satisfied; or receiving an instruction to stop using the second MG configuration.

Clause 16. The method of any of clauses 14 to 15, wherein the default MG configuration comprises the first MG configuration, wherein the default MG comprises the first MG, and wherein the third set of positioning signals comprises the first set of positioning signals.

Clause 17. A method of wireless communication performed by a user equipment (UE), the method comprising: determining a plurality of measurement gap (MG) configurations, each MG configuration defining one or more MGs, each MG having a measurement gap length (MGL) and a measurement gap offset (MGO) and indicating a reference cell for measurement reporting; measuring a first set of positioning signals using one MG configuration from the plurality of MG configurations; and reporting the measurement to the reference cell for measurement reporting indicated by the one MG configuration.

Clause 18. The method of clause 17, wherein determining the plurality of MG configurations comprises receiving the plurality of MG configurations from a base station, from a core network entity, from a location management server (LMS), or from location management function (LMF).

Clause 19. The method of any of clauses 17 to 18, wherein determining the plurality of MG configurations comprises receiving the plurality of MG configurations via radio resource control (RRC) signaling.

Clause 20. The method of any of clauses 17 to 19, further comprising: sending, to a serving base station, a second request to use a second MG configuration from the plurality of MG configurations; receiving, from the serving base station, a response to the second request; and measuring a second set of positioning signals using an MG configuration indicated by the response to the second request; and reporting the measurement to the reference cell for measurement reporting indicated by the MG configuration indicated by the response to the second request.

Clause 21. The method of clause 20, wherein sending the second request comprises selecting the second MG configuration from the plurality of MG configurations based on measurements of the first set of positioning signals.

Clause 22. The method of clause 21, wherein selecting the second MG configuration from the plurality of MG configurations based on the measurements of the first set of positioning signals comprises: identifying, from the first set of positioning signals, a first subset of positioning signals based on a quality metric; and selecting the second MG configuration from the plurality of MG configurations based on the first subset of positioning signals.

Clause 23. The method of clause 22, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

Clause 24. The method of any of clauses 22 to 23, wherein the first subset of positioning signals satisfy a quality metric and wherein selecting the second MG configuration based on the first subset of positioning signals comprises selecting an MG configuration having an MG that includes the first subset of positioning signals.

Clause 25. The method of clause 24, wherein selecting the MG configuration having the MG that includes the first subset of positioning signals comprises selecting an MG configuration having the smallest MG that includes the first subset of positioning signals.

Clause 26. The method of any of clauses 22 to 25, wherein the first subset of positioning signals fail to satisfy a quality metric and wherein selecting the second MG configuration based on the first subset of positioning signals comprises selecting an MG configuration having an MG that excludes the first subset of positioning signals.

Clause 27. The method of clause 26, wherein selecting the MG configuration having the MG that excludes the first subset of positioning signals comprises selecting an MG configuration having the largest MG that excludes the first subset of positioning signals.

Clause 28. The method of any of clauses 20 to 27, wherein one MG configuration of the plurality of MG configurations is identified as a default MG configuration.

Clause 29. The method of clause 28, further comprising: detecting a first trigger condition; sending, to the serving base station, a request to use the default MG configuration from the plurality of MG configurations, the default MG configuration defining a default MG; receiving, from the serving base station, a response to the request to use the default MG configuration; and measuring a third set of positioning signals using an MG configuration indicated by the response to the request to use the default MG configuration.

Clause 30. The method of clause 29, wherein detecting the first trigger condition comprises: detecting that a time limit for using the second MG configuration has expired; detecting that a threshold number of measurements using the second MG configuration has been satisfied; or receiving an instruction to stop using the second MG configuration.

Clause 31. A method of wireless communication performed by a user equipment (UE), the method comprising: determining a plurality of measurement gap (MG) configurations, each MG configuration defining one or more MGs, each MG having a measurement gap length (MGL) and a measurement gap offset (MGO); sending, to a serving base station, a first request to use a first MG configuration from the plurality of MG configurations; receiving, from the serving base station, a response to the first request; measuring a first set of positioning signals using an MG configuration indicated by the response to the first request; sending, to the serving base station, a request to receive an updated plurality of MG configurations; receiving, from the serving base station, the updated plurality of MG configurations, the updated plurality of MG configurations comprising at least one new MG configuration; and measuring a second set of positioning signals using an MG configuration from among the updated plurality of MG configurations.

Clause 32. The method of clause 31, wherein sending the request to receive the updated plurality of MG configurations comprises sending the request in response to determining that no positioning signal in the first set of positioning signals meets a minimum quality standard.

Clause 33. A method of wireless communication performed by a network entity, the method comprising: sending, to a user equipment (UE), a plurality of measurement gap (MG) configurations, each MG configuration defining an MG having a measurement gap length (MGL) and a measurement gap offset (MGO); receiving, from the UE, a first request to use a first MG configuration from the plurality of MG configurations; sending, to the UE, a response to the first request, the response indicating an MG configuration to be used by the UE; receiving, from the UE, a second request to change at least one MG configuration;

and sending, to the UE, a response to the second request to change at least one MG configuration.

Clause 34. The method of clause 33, wherein each MG configuration in the plurality of MG configurations indicates a reference cell for measurement reporting.

Clause 35. The method of any of clauses 33 to 34, wherein one MG configuration in the plurality of MG configurations is identified as a default MG configuration.

Clause 36. The method of any of clauses 33 to 35, wherein receiving the second request comprises receiving a request to use a second MG configuration from the plurality of MG configurations, and wherein sending the response to the second request comprises sending an indication identifying an MG configuration from the plurality of MG configurations to be used by the UE.

Clause 37. The method of clause 36, wherein the MG configuration indicated by the response to the second request is the same as the second MG configuration or different from the second MG configuration.

Clause 38. The method of any of clauses 33 to 37, wherein receiving the second request comprises receiving a request to receive an updated plurality of MG configurations, and wherein sending the response to the second request comprises sending the updated plurality of MG configurations, the updated plurality of MG configurations comprising at least one new MG configuration.

Clause 39. The method of any of clauses 33 to 38, wherein the response to the second request to change at least one MG configuration indicates that no MG configuration is changed.

Clause 40. The method of any of clauses 33 to 39, wherein the network entity comprises a base station or a core network entity.

Clause 41. The method of any of clauses 33 to 40, wherein the network entity comprises a core network entity.

Clause 42. The method of clause 41, wherein the core network entity comprises a location management server (LMS) or a location management function (LMF).

Clause 43. A user equipment (UE), comprising: a memory; at least one transceiver; and at least one processor communicatively coupled to the memory and the at least one transceiver, the at least one processor configured to: determine a plurality of measurement gap (MG) configurations, each MG configuration defining one or more MGs, each MG having a measurement gap length (MGL) and a measurement gap offset (MGO); send, via the at least one transceiver, to a serving base station, a first request to use a first MG configuration from the plurality of MG configurations; receive, via the at least one transceiver, from the serving base station, a response to the first request; measure a first set of positioning signals using an MG configuration indicated by the response to the first request; select, based on measurements of the first set of positioning signals, a second MG configuration from the plurality of MG configurations; send, via the at least one transceiver, to the serving base station, a second request to use the second MG configuration from the plurality of MG configurations; receive, via the at least one transceiver, from the serving base station, a response to the second request; and measure a second set of positioning signals using an MG configuration indicated by the response to the second request.

Clause 44. The UE of clause 43, wherein the second MG configuration indicates a reference cell for measurement reporting and wherein the method further comprises sending a measurement report to the reference cell indicated by the second MG configuration.

Clause 45. The UE of any of clauses 43 to 44, wherein, to determine the plurality of MG configurations, the at least one processor is configured to receive the plurality of MG configurations from a base station, from a core network entity, from a location management server (LMS), or from location management function (LMF).

Clause 46. The UE of any of clauses 43 to 45, wherein, to determine the plurality of MG configurations, the at least one processor is configured to receive the plurality of MG configurations via radio resource control (RRC) signaling.

Clause 47. The UE of any of clauses 43 to 46, wherein the MG configuration indicated by the response to the first request is the same as the first MG configuration or different from the first MG configuration.

Clause 48. The UE of any of clauses 43 to 47, wherein the MG configuration indicated by the response to the second request is the same as the second MG configuration or different from the second MG configuration.

Clause 49. The UE of any of clauses 43 to 48, wherein at least one positioning signal within at least one of the first set of positioning signals or the second set of positioning signals comprises a positioning reference signal (PRS) or a tracking reference signal (TRS).

Clause 50. The UE of any of clauses 43 to 49, wherein, to select the second MG configuration from the plurality of MG configurations based on the measurements of the first set of positioning signals, the at least one processor is configured to: identify, from the first set of positioning signals, a first subset of positioning signals based on a quality metric; and select the second MG configuration from the plurality of MG configurations based on the first subset of positioning signals.

Clause 51. The UE of clause 50, wherein the quality metric comprises a reference signal received power (RSRP) value, a reference signal received quality (RSRQ) value, a signal to interference plus noise (SINR) value, a quality of a timing measurement, a dilution of precision metric, or various combinations thereof.

Clause 52. The UE of any of clauses 50 to 51, wherein the first subset of positioning signals satisfy a quality metric and wherein selecting the second MG configuration based on the first subset of positioning signals comprises selecting an MG configuration having an MG that includes the first subset of positioning signals.

Clause 53. The UE of clause 52, wherein, to select the MG configuration having the MG that, the at least one processor is configured to the first subset of positioning signals comprises selecting an MG configuration having the smallest MG that includes the first subset of positioning signals.

Clause 54. The UE of any of clauses 50 to 53, wherein the first subset of positioning signals fail to satisfy a quality metric and wherein selecting the second MG configuration based on the first subset of positioning signals comprises selecting an MG configuration having an MG that excludes the first subset of positioning signals.

Clause 55. The UE of clause 54, wherein, to select the MG configuration having the MG that excludes the first subset of positioning signals, the at least one processor is configured to select an MG configuration having the largest MG that excludes the first subset of positioning signals.

Clause 56. The UE of any of clauses 43 to 55, wherein the at least one processor is further configured to: detect a first trigger condition; send, via the at least one transceiver, to the serving base station, a request to use a default MG configuration from the plurality of MG configurations, the default MG configuration defining a default MG; receive, via the at least one transceiver, from the serving base station, a response to the request to use the default MG configuration; and measure a third set of positioning signals using an MG configuration indicated by the response to the request to use the default MG configuration.

Clause 57. The UE of clause 56, wherein, to detect the first trigger condition, the at least one processor is configured to: detect that a time limit for using the second MG configuration has expired; detect that a threshold number of measurements using the second MG configuration has been satisfied; or receive, via the at least one transceiver, an instruction to stop using the second MG configuration.

Clause 58. The UE of any of clauses 56 to 57, wherein the default MG configuration comprises the first MG configuration, wherein the default MG comprises the first MG, and wherein the third set of positioning signals comprises the first set of positioning signals.

Clause 59. A user equipment (UE), comprising: a memory; at least one transceiver; and at least one processor communicatively coupled to the memory and the at least one transceiver, the at least one processor configured to: determine a plurality of measurement gap (MG) configurations, each MG configuration defining one or more MGs, each MG having a measurement gap length (MGL) and a measurement gap offset (MGO) and indicating a reference cell for measurement reporting; measure a first set of positioning signals using one MG configuration from the plurality of MG configurations; and report the measurement to the reference cell for measurement reporting indicated by the one MG configuration.

Clause 60. The UE of clause 59, wherein, to determine the plurality of MG configurations, the at least one processor is configured to receive the plurality of MG configurations from a base station, from a core network entity, from a location management server (LMS), or from location management function (LMF).

Clause 61. The UE of any of clauses 59 to 60, wherein, to determine the plurality of MG configurations, the at least one processor is configured to receive the plurality of MG configurations via radio resource control (RRC) signaling.

Clause 62. The UE of any of clauses 59 to 61, wherein the at least one processor is further configured to: send, via the at least one transceiver, to a serving base station, a second request to use a second MG configuration from the plurality of MG configurations; receive, via the at least one transceiver, from the serving base station, a response to the second request; and measure a second set of positioning signals using an MG configuration indicated by the response to the second request; and report the measurement to the reference cell for measurement reporting indicated by the MG configuration indicated by the response to the second request.

Clause 63. The UE of clause 62, wherein, to send the second request, the at least one processor is configured to select the second MG configuration from the plurality of MG configurations based on measurements of the first set of positioning signals.

Clause 64. The UE of clause 63, wherein, to select the second MG configuration from the plurality of MG configurations based on the measurements of the first set of positioning signals, the at least one processor is configured to: identify, from the first set of positioning signals, a first subset of positioning signals based on a quality metric; and select the second MG configuration from the plurality of MG configurations based on the first subset of positioning signals.

Clause 65. The UE of clause 64, wherein the quality metric comprises a reference signal received power (RSRP) value, a reference signal received quality (RSRQ) value, a signal to interference plus noise (SINR) value, a quality of a timing measurement, a dilution of precision metric, or various combinations thereof.

Clause 66. The UE of any of clauses 64 to 65, wherein the first subset of positioning signals satisfy a quality metric and wherein selecting the second MG configuration based on the first subset of positioning signals comprises selecting an MG configuration having an MG that includes the first subset of positioning signals.

Clause 67. The UE of clause 66, wherein, to select the MG configuration having the MG that, the at least one processor is configured to the first subset of positioning signals comprises selecting an MG configuration having the smallest MG that includes the first subset of positioning signals.

Clause 68. The UE of any of clauses 64 to 67, wherein the first subset of positioning signals fail to satisfy a quality metric and wherein selecting the second MG configuration based on the first subset of positioning signals comprises selecting an MG configuration having an MG that excludes the first subset of positioning signals.

Clause 69. The UE of clause 68, wherein, to select the MG configuration having the MG that excludes the first subset of positioning signals, the at least one processor is configured to select an MG configuration having the largest MG that excludes the first subset of positioning signals.

Clause 70. The UE of any of clauses 62 to 69, wherein one MG configuration of the plurality of MG configurations is identified as a default MG configuration.

Clause 71. The UE of clause 70, wherein the at least one processor is further configured to: detect a first trigger condition; send, via the at least one transceiver, to the serving base station, a request to use the default MG configuration from the plurality of MG configurations, the default MG configuration defining a default MG; receive, via the at least one transceiver, from the serving base station, a response to the request to use the default MG configuration; and measure a third set of positioning signals using an MG configuration indicated by the response to the request to use the default MG configuration.

Clause 72. The UE of clause 71, wherein, to detect the first trigger condition, the at least one processor is configured to: detect that a time limit for using the second MG configuration has expired; detect that a threshold number of measurements using the second MG configuration has been satisfied; or receive, via the at least one transceiver, an instruction to stop using the second MG configuration.

Clause 73. A user equipment (UE), comprising: a memory; at least one transceiver; and at least one processor communicatively coupled to the memory and the at least one transceiver, the at least one processor configured to: determine a plurality of measurement gap (MG) configurations, each MG configuration defining one or more MGs, each MG having a measurement gap length (MGL) and a measurement gap offset (MGO); send, via the at least one transceiver, to a serving base station, a first request to use a first MG configuration from the plurality of MG configurations; receive, via the at least one transceiver, from the serving base station, a response to the first request; measure a first set of positioning signals using an MG configuration indicated by the response to the first request; send, via the at least one transceiver, to the serving base station, a request to receive an updated plurality of MG configurations; receive, via the at least one transceiver, from the serving base station, the updated plurality of MG configurations, the updated plurality of MG configurations comprising at least one new MG configuration; and measure a second set of positioning signals using an MG configuration from among the updated plurality of MG configurations.

Clause 74. The UE of clause 73, wherein, to send the request to receive the updated plurality of MG configurations, the at least one processor is configured to send the request in response to determining that no positioning signal in the first set of positioning signals meets a minimum quality standard.

Clause 75. A network entity, comprising: a memory; at least one transceiver; and at least one processor communicatively coupled to the memory and the at least one transceiver, the at least one processor configured to: send, via the at least one transceiver, to a user equipment (UE), a plurality of measurement gap (MG) configurations, each MG configuration defining an MG having a measurement gap length (MGL) and a measurement gap offset (MGO); receive, via the at least one transceiver, from the UE, a first request to use a first MG configuration from the plurality of MG configurations; send, via the at least one transceiver, to the UE, a response to the first request, the response indicating an MG configuration to be used by the UE; receive, via the at least one transceiver, from the UE, a second request to change at least one MG configuration; and send, via the at least one transceiver, to the UE, a response to the second request to change at least one MG configuration.

Clause 76. The network entity of clause 75, wherein each MG configuration in the plurality of MG configurations indicates a reference cell for measurement reporting.

Clause 77. The network entity of any of clauses 75 to 76, wherein one MG configuration in the plurality of MG configurations is identified as a default MG configuration.

Clause 78. The network entity of any of clauses 75 to 77, wherein receiving the second request comprises receiving a request to use a second MG configuration from the plurality of MG configurations, and wherein sending the response to the second request comprises sending an indication identifying an MG configuration from the plurality of MG configurations to be used by the UE.

Clause 79. The network entity of clause 78, wherein the MG configuration indicated by the response to the second request is the same as the second MG configuration or different from the second MG configuration.

Clause 80. The network entity of any of clauses 75 to 79, wherein receiving the second request comprises receiving a request to receive an updated plurality of MG configurations, and wherein sending the response to the second request comprises sending the updated plurality of MG configurations, the updated plurality of MG configurations comprising at least one new MG configuration.

Clause 81. The network entity of any of clauses 75 to 80, wherein the response to the second request to change at least one MG configuration indicates that no MG configuration is changed.

Clause 82. The network entity of any of clauses 75 to 81, wherein the network entity comprises a base station or a core network entity.

Clause 83. The network entity of any of clauses 75 to 82, wherein the network entity comprises a core network entity.

Clause 84. The network entity of clause 83, wherein the core network entity comprises a location management server (LMS) or a location management function (LMF).

Clause 85. A user equipment (UE), comprising: means for determining a plurality of measurement gap (MG) configurations, each MG configuration defining one or more MGs, each MG having a measurement gap length (MGL) and a measurement gap offset (MGO); means for sending, to a serving base station, a first request to use a first MG configuration from the plurality of MG configurations; means for receiving, from the serving base station, a response to the first request; means for measuring a first set of positioning signals using an MG configuration indicated by the response to the first request; means for selecting, based on measurements of the first set of positioning signals, a second MG configuration from the plurality of MG configurations; means for sending, to the serving base station, a second request to use the second MG configuration from the plurality of MG configurations; means for receiving, from the serving base station, a response to the second request; and means for measuring a second set of positioning signals using an MG configuration indicated by the response to the second request.

Clause 86. The UE of clause 85, wherein the second MG configuration indicates a reference cell for measurement reporting and wherein the method further comprises sending a measurement report to the reference cell indicated by the second MG configuration.

Clause 87. The UE of any of clauses 85 to 86, wherein the means for determining the plurality of MG configurations comprises means for receiving the plurality of MG configurations from a base station, from a core network entity, from a location management server (LMS), or from location management function (LMF).

Clause 88. The UE of any of clauses 85 to 87, wherein the means for determining the plurality of MG configurations comprises means for receiving the plurality of MG configurations via radio resource control (RRC) signaling.

Clause 89. The UE of any of clauses 85 to 88, wherein the MG configuration indicated by the response to the first request is the same as the first MG configuration or different from the first MG configuration.

Clause 90. The UE of any of clauses 85 to 89, wherein the MG configuration indicated by the response to the second request is the same as the second MG configuration or different from the second MG configuration.

Clause 91. The UE of any of clauses 85 to 90, wherein at least one positioning signal within at least one of the first set of positioning signals or the second set of positioning signals comprises a positioning reference signal (PRS) or a tracking reference signal (TRS).

Clause 92. The UE of any of clauses 85 to 91, wherein the means for selecting the second MG configuration from the plurality of MG configurations based on the measurements of the first set of positioning signals comprises: means for identifying, from the first set of positioning signals, a first subset of positioning signals based on a quality metric; and means for selecting the second MG configuration from the plurality of MG configurations based on the first subset of positioning signals.

Clause 93. The UE of clause 92, wherein the quality metric comprises a reference signal received power (RSRP) value, a reference signal received quality (RSRQ) value, a signal to interference plus noise (SINR) value, a quality of a timing measurement, a dilution of precision metric, or various combinations thereof.

Clause 94. The UE of any of clauses 92 to 93, wherein the first subset of positioning signals satisfy a quality metric and wherein selecting the second MG configuration based on the first subset of positioning signals comprises selecting an MG configuration having an MG that includes the first subset of positioning signals.

Clause 95. The UE of clause 94, wherein the means for selecting the MG configuration having the MG that includes means for the first subset of positioning signals comprises selecting an MG configuration having the smallest MG that includes the first subset of positioning signals.

Clause 96. The UE of any of clauses 92 to 95, wherein the first subset of positioning signals fail to satisfy a quality metric and wherein selecting the second MG configuration based on the first subset of positioning signals comprises selecting an MG configuration having an MG that excludes the first subset of positioning signals.

Clause 97. The UE of clause 96, wherein the means for selecting the MG configuration having the MG that excludes the first subset of positioning signals comprises means for selecting an MG configuration having the largest MG that excludes the first subset of positioning signals.

Clause 98. The UE of any of clauses 85 to 97, further comprising: means for detecting a first trigger condition; means for sending, to the serving base station, a request to use a default MG configuration from the plurality of MG configurations, the default MG configuration defining a default MG; means for receiving, from the serving base station, a response to the request to use the default MG configuration; and means for measuring a third set of positioning signals using an MG configuration indicated by the response to the request to use the default MG configuration.

Clause 99. The UE of clause 98, wherein the means for detecting the first trigger condition comprises: means for detecting that a time limit for using the second MG configuration has expired; means for detecting that a threshold number of measurements using the second MG configuration has been satisfied; or means for receiving an instruction to stop using the second MG configuration.

Clause 100. The UE of any of clauses 98 to 99, wherein the default MG configuration comprises the first MG configuration, wherein the default MG comprises the first MG, and wherein the third set of positioning signals comprises the first set of positioning signals.

Clause 101. A user equipment (UE), comprising: means for determining a plurality of measurement gap (MG) configurations, each MG configuration defining one or more MGs, each MG having a measurement gap length (MGL) and a measurement gap offset (MGO) and indicating a reference cell for measurement reporting; means for measuring a first set of positioning signals using one MG configuration from the plurality of MG configurations; and means for reporting the measurement to the reference cell for measurement reporting indicated by the one MG configuration.

Clause 102. The UE of clause 101, wherein the means for determining the plurality of MG configurations comprises means for receiving the plurality of MG configurations from a base station, from a core network entity, from a location management server (LMS), or from location management function (LMF).

Clause 103. The UE of any of clauses 101 to 102, wherein the means for determining the plurality of MG configurations comprises means for receiving the plurality of MG configurations via radio resource control (RRC) signaling.

Clause 104. The UE of any of clauses 101 to 103, further comprising: means for sending, to a serving base station, a second request to use a second MG configuration from the plurality of MG configurations; means for receiving, from the serving base station, a response to the second request; and means for measuring a second set of positioning signals using an MG configuration indicated by the response to the second request; and means for reporting the measurement to the reference cell for measurement reporting indicated by the MG configuration indicated by the response to the second request.

Clause 105. The UE of clause 104, wherein the means for sending the second request comprises means for selecting the second MG configuration from the plurality of MG configurations based on measurements of the first set of positioning signals.

Clause 106. The UE of clause 105, wherein the means for selecting the second MG configuration from the plurality of MG configurations based on the measurements of the first set of positioning signals comprises: means for identifying, from the first set of positioning signals, a first subset of positioning signals based on a quality metric; and means for selecting the second MG configuration from the plurality of MG configurations based on the first subset of positioning signals.

Clause 107. The UE of clause 106, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

Clause 108. The UE of any of clauses 106 to 107, wherein the first subset of positioning signals satisfy a quality metric and wherein selecting the second MG configuration based on the first subset of positioning signals comprises selecting an MG configuration having an MG that includes the first subset of positioning signals.

Clause 109. The UE of clause 108, wherein the means for selecting the MG configuration having the MG that includes means for the first subset of positioning signals comprises selecting an MG configuration having the smallest MG that includes the first subset of positioning signals.

Clause 110. The UE of any of clauses 106 to 109, wherein the first subset of positioning signals fail to satisfy a quality metric and wherein selecting the second MG configuration based on the first subset of positioning signals comprises selecting an MG configuration having an MG that excludes the first subset of positioning signals.

Clause 111. The UE of clause 110, wherein the means for selecting the MG configuration having the MG that excludes the first subset of positioning signals comprises means for selecting an MG configuration having the largest MG that excludes the first subset of positioning signals.

Clause 112. The UE of any of clauses 104 to 111, wherein one MG configuration of the plurality of MG configurations is identified as a default MG configuration.

Clause 113. The UE of clause 112, further comprising: means for detecting a first trigger condition; means for sending, to the serving base station, a request to use the default MG configuration from the plurality of MG configurations, the default MG configuration defining a default MG; means for receiving, from the serving base station, a response to the request to use the default MG configuration; and means for measuring a third set of positioning signals using an MG configuration indicated by the response to the request to use the default MG configuration.

Clause 114. The UE of clause 113, wherein the means for detecting the first trigger condition comprises: means for detecting that a time limit for using the second MG configuration has expired; means for detecting that a threshold number of measurements using the second MG configuration has been satisfied; or means for receiving an instruction to stop using the second MG configuration.

Clause 115. A user equipment (UE), comprising: means for determining a plurality of measurement gap (MG) configurations, each MG configuration defining one or more MGs, each MG having a measurement gap length (MGL) and a measurement gap offset (MGO); means for sending, to a serving base station, a first request to use a first MG configuration from the plurality of MG configurations; means for receiving, from the serving base station, a response to the first request; means for measuring a first set of positioning signals using an MG configuration indicated by the response to the first request; means for sending, to the serving base station, a request to receive an updated plurality of MG configurations; means for receiving, from the serving base station, the updated plurality of MG configurations, the updated plurality of MG configurations comprising at least one new MG configuration; and means for measuring a second set of positioning signals using an MG configuration from among the updated plurality of MG configurations.

Clause 116. The UE of clause 115, wherein the means for sending the request to receive the updated plurality of MG configurations comprises means for sending the request in response to determining that no positioning signal in the first set of positioning signals meets a minimum quality standard.

Clause 117. A network entity, comprising: means for sending, to a user equipment (UE), a plurality of measurement gap (MG) configurations, each MG configuration defining an MG having a measurement gap length (MGL) and a measurement gap offset (MGO); means for receiving, from the UE, a first request to use a first MG configuration from the plurality of MG configurations; means for sending, to the UE, a response to the first request, the response indicating an MG configuration to be used by the UE; means for receiving, from the UE, a second request to change at least one MG configuration; and means for sending, to the UE, a response to the second request to change at least one MG configuration.

Clause 118. The network entity of clause 117, wherein each MG configuration in the plurality of MG configurations indicates a reference cell for measurement reporting.

Clause 119. The network entity of any of clauses 117 to 118, wherein one MG configuration in the plurality of MG configurations is identified as a default MG configuration.

Clause 120. The network entity of any of clauses 117 to 119, wherein receiving the second request comprises receiving a request to use a second MG configuration from the plurality of MG configurations, and wherein sending the response to the second request comprises sending an indication identifying an MG configuration from the plurality of MG configurations to be used by the UE.

Clause 121. The network entity of clause 120, wherein the MG configuration indicated by the response to the second request is the same as the second MG configuration or different from the second MG configuration.

Clause 122. The network entity of any of clauses 117 to 121, wherein receiving the second request comprises receiving a request to receive an updated plurality of MG configurations, and wherein sending the response to the second request comprises sending the updated plurality of MG configurations, the updated plurality of MG configurations comprising at least one new MG configuration.

Clause 123. The network entity of any of clauses 117 to 122, wherein the response to the second request to change at least one MG configuration indicates that no MG configuration is changed.

Clause 124. The network entity of any of clauses 117 to 123, wherein the network entity comprises a base station or a core network entity.

Clause 125. The network entity of any of clauses 117 to 124, wherein the network entity comprises a core network entity.

Clause 126. The network entity of clause 125, wherein the core network entity comprises a location management server (LMS) or a location management function (LMF).

Clause 127. A non-transitory computer-readable medium storing computer-executable instructions that, when executed by a user equipment (UE), cause the UE to: determine a plurality of measurement gap (MG) configurations, each MG configuration defining one or more MGs, each MG having a measurement gap length (MGL) and a measurement gap offset (MGO); send, to a serving base station, a first request to use a first MG configuration from the plurality of MG configurations; receive, from the serving base station, a response to the first request; measure a first set of positioning signals using an MG configuration indicated by the response to the first request; select, based on measurements of the first set of positioning signals, a second MG configuration from the plurality of MG configurations; send, to the serving base station, a second request to use the second MG configuration from the plurality of MG configurations; receive, from the serving base station, a response to the second request; and measure a second set of positioning signals using an MG configuration indicated by the response to the second request.

Clause 128. The non-transitory computer-readable medium of clause 127, wherein the second MG configuration indicates a reference cell for measurement reporting and wherein the method further comprises sending a measurement report to the reference cell indicated by the second MG configuration.

Clause 129. The non-transitory computer-readable medium of any of clauses 127 to 128, wherein the computer-executable instructions that, when executed by the UE, cause the UE to determine the plurality of MG configurations comprise computer-executable instructions that, when executed by the UE, cause the UE to receive the plurality of MG configurations from a base station, from a core network entity, from a location management server (LMS), or from location management function (LMF).

Clause 130. The non-transitory computer-readable medium of any of clauses 127 to 129, wherein the computer-executable instructions that, when executed by the UE, cause the UE to determine the plurality of MG configurations comprise computer-executable instructions that, when executed by the UE, cause the UE to receive the plurality of MG configurations via radio resource control (RRC) signaling.

Clause 131. The non-transitory computer-readable medium of any of clauses 127 to 130, wherein the MG configuration indicated by the response to the first request is the same as the first MG configuration or different from the first MG configuration.

Clause 132. The non-transitory computer-readable medium of any of clauses 127 to 131, wherein the MG configuration indicated by the response to the second request is the same as the second MG configuration or different from the second MG configuration.

Clause 133. The non-transitory computer-readable medium of any of clauses 127 to 132, wherein at least one positioning signal within at least one of the first set of positioning signals or the second set of positioning signals comprises a positioning reference signal (PRS) or a tracking reference signal (TRS).

Clause 134. The non-transitory computer-readable medium of any of clauses 127 to 133, wherein the computer-executable instructions that, when executed by the UE, cause the UE to select the second MG configuration from the plurality of MG configurations based on the measurements of the first set of positioning signals comprise computer-executable instructions that, when executed by the UE, cause the UE to: identify, from the first set of positioning signals, a first subset of positioning signals based on a quality metric; and select the second MG configuration from the plurality of MG configurations based on the first subset of positioning signals.

Clause 135. The non-transitory computer-readable medium of clause 134, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

Clause 136. The non-transitory computer-readable medium of any of clauses 134 to 135, wherein the first subset of positioning signals satisfy a quality metric and wherein selecting the second MG configuration based on the first subset of positioning signals comprises selecting an MG configuration having an MG that includes the first subset of positioning signals.

Clause 137. The non-transitory computer-readable medium of clause 136, wherein the computer-executable instructions that, when executed by the UE, cause the UE to select the MG configuration having the MG that comprise computer-executable instructions that, when executed by the UE, cause the UE to the first subset of positioning signals comprises selecting an MG configuration having the smallest MG that includes the first subset of positioning signals.

Clause 138. The non-transitory computer-readable medium of any of clauses 134 to 137, wherein the first subset of positioning signals fail to satisfy a quality metric and wherein selecting the second MG configuration based on the first subset of positioning signals comprises selecting an MG configuration having an MG that excludes the first subset of positioning signals.

Clause 139. The non-transitory computer-readable medium of clause 138, wherein the computer-executable instructions that, when executed by the UE, cause the UE to select the MG configuration having the MG that excludes the first subset of positioning signals comprise computer-executable instructions that, when executed by the UE, cause the UE to select an MG configuration having the largest MG that excludes the first subset of positioning signals.

Clause 140. The non-transitory computer-readable medium of any of clauses 127 to 139, further comprising computer-executable instructions that, when executed by the UE, cause the UE to: detect a first trigger condition; send, to the serving base station, a request to use a default MG configuration from the plurality of MG configurations, the default MG configuration defining a default MG; receive, from the serving base station, a response to the request to use the default MG configuration; and measure a third set of positioning signals using an MG configuration indicated by the response to the request to use the default MG configuration.

Clause 141. The non-transitory computer-readable medium of clause 140, wherein the computer-executable instructions that, when executed by the UE, cause the UE to detect the first trigger condition comprise computer-executable instructions that, when executed by the UE, cause the UE to: detect that a time limit for using the second MG configuration has expired; detect that a threshold number of measurements using the second MG configuration has been satisfied; or receive an instruction to stop using the second MG configuration.

Clause 142. The non-transitory computer-readable medium of any of clauses 140 to 141, wherein the default MG configuration comprises the first MG configuration, wherein the default MG comprises the first MG, and wherein the third set of positioning signals comprises the first set of positioning signals.

Clause 143. A non-transitory computer-readable medium storing computer-executable instructions that, when executed by an UE, cause the UE to: determine a plurality of measurement gap (MG) configurations, each MG configuration defining one or more MGs, each MG having a measurement gap length (MGL) and a measurement gap offset (MGO) and indicating a reference cell for measurement reporting; measure a first set of positioning signals using one MG configuration from the plurality of MG configurations; and report the measurement to the reference cell for measurement reporting indicated by the one MG configuration.

Clause 144. The non-transitory computer-readable medium of clause 143, wherein the computer-executable instructions that, when executed by the UE, cause the UE to determine the plurality of MG configurations comprise computer-executable instructions that, when executed by the UE, cause the UE to receive the plurality of MG configurations from a base station, from a core network entity, from a location management server (LMS), or from location management function (LMF).

Clause 145. The non-transitory computer-readable medium of any of clauses 143 to 144, wherein the computer-executable instructions that, when executed by the UE, cause the UE to determine the plurality of MG configurations comprise computer-executable instructions that, when executed by the UE, cause the UE to receive the plurality of MG configurations via radio resource control (RRC) signaling.

Clause 146. The non-transitory computer-readable medium of any of clauses 143 to 145, further comprising computer-executable instructions that, when executed by the UE, cause the UE to: send, to a serving base station, a second request to use a second MG configuration from the plurality of MG configurations; receive, from the serving base station, a response to the second request; and measure a second set of positioning signals using an MG configuration indicated by the response to the second request; and report the measurement to the reference cell for measurement reporting indicated by the MG configuration indicated by the response to the second request.

Clause 147. The non-transitory computer-readable medium of clause 146, wherein the computer-executable instructions that, when executed by the UE, cause the UE to send the second request comprise computer-executable instructions that, when executed by the UE, cause the UE to select the second MG configuration from the plurality of MG configurations based on measurements of the first set of positioning signals.

Clause 148. The non-transitory computer-readable medium of clause 147, wherein the computer-executable instructions that, when executed by the UE, cause the UE to select the second MG configuration from the plurality of MG configurations based on the measurements of the first set of positioning signals comprise computer-executable instructions that, when executed by the UE, cause the UE to: identify, from the first set of positioning signals, a first subset of positioning signals based on a quality metric; and select the second MG configuration from the plurality of MG configurations based on the first subset of positioning signals.

Clause 149. The non-transitory computer-readable medium of clause 148, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

Clause 150. The non-transitory computer-readable medium of any of clauses 148 to 149, wherein the first subset of positioning signals satisfy a quality metric and wherein selecting the second MG configuration based on the first subset of positioning signals comprises selecting an MG configuration having an MG that includes the first subset of positioning signals.

Clause 151. The non-transitory computer-readable medium of clause 150, wherein the computer-executable instructions that, when executed by the UE, cause the UE to select the MG configuration having the MG that comprise computer-executable instructions that, when executed by the UE, cause the UE to the first subset of positioning signals comprises selecting an MG configuration having the smallest MG that includes the first subset of positioning signals.

Clause 152. The non-transitory computer-readable medium of any of clauses 148 to 151, wherein the first subset of positioning signals fail to satisfy a quality metric and wherein selecting the second MG configuration based on the first subset of positioning signals comprises selecting an MG configuration having an MG that excludes the first subset of positioning signals.

Clause 153. The non-transitory computer-readable medium of clause 152, wherein the computer-executable instructions that, when executed by the UE, cause the UE to select the MG configuration having the MG that excludes the first subset of positioning signals comprise computer-executable instructions that, when executed by the UE, cause the UE to select an MG configuration having the largest MG that excludes the first subset of positioning signals.

Clause 154. The non-transitory computer-readable medium of any of clauses 146 to 153, wherein one MG configuration of the plurality of MG configurations is identified as a default MG configuration.

Clause 155. The non-transitory computer-readable medium of clause 154, further comprising computer-executable instructions that, when executed by the UE, cause the UE to: detect a first trigger condition; send, to the serving base station, a request to use the default MG configuration from the plurality of MG configurations, the default MG configuration defining a default MG; receive, from the serving base station, a response to the request to use the default MG configuration; and measure a third set of positioning signals using an MG configuration indicated by the response to the request to use the default MG configuration.

Clause 156. The non-transitory computer-readable medium of clause 155, wherein the computer-executable instructions that, when executed by the UE, cause the UE to detect the first trigger condition comprise computer-executable instructions that, when executed by the UE, cause the UE to: detect that a time limit for using the second MG configuration has expired; detect that a threshold number of measurements using the second MG configuration has been satisfied; or receive an instruction to stop using the second MG configuration.

Clause 157. A non-transitory computer-readable medium storing computer-executable instructions that, when executed by an UE, cause the UE to: determine a plurality of measurement gap (MG) configurations, each MG configuration defining one or more MGs, each MG having a measurement gap length (MGL) and a measurement gap offset (MGO); send, to a serving base station, a first request to use a first MG configuration from the plurality of MG configurations; receive, from the serving base station, a response to the first request; measure a first set of positioning signals using an MG configuration indicated by the response to the first request; send, to the serving base station, a request to receive an updated plurality of MG configurations; receive, from the serving base station, the updated plurality of MG configurations, the updated plurality of MG configurations comprising at least one new MG configuration; and measure a second set of positioning signals using an MG configuration from among the updated plurality of MG configurations.

Clause 158. The non-transitory computer-readable medium of clause 157, wherein the computer-executable instructions that, when executed by the UE, cause the UE to send the request to receive the updated plurality of MG configurations comprise computer-executable instructions that, when executed by the UE, cause the UE to send the request in response to determining that no positioning signal in the first set of positioning signals meets a minimum quality standard.

Clause 159. A non-transitory computer-readable medium storing computer-executable instructions that, when executed by a network entity, cause the network entity to: send, to a user equipment (UE), a plurality of measurement gap (MG) configurations, each MG configuration defining an MG having a measurement gap length (MGL) and a measurement gap offset (MGO); receive, from the UE, a first request to use a first MG configuration from the plurality of MG configurations; send, to the UE, a response to the first request, the response indicating an MG configuration to be used by the UE; receive, from the UE, a second request to change at least one MG configuration; and send, to the UE, a response to the second request to change at least one MG configuration.

Clause 160. The non-transitory computer-readable medium of clause 159, wherein each MG configuration in the plurality of MG configurations indicates a reference cell for measurement reporting.

Clause 161. The non-transitory computer-readable medium of any of clauses 159 to 160, wherein one MG configuration in the plurality of MG configurations is identified as a default MG configuration.

Clause 162. The non-transitory computer-readable medium of any of clauses 159 to 161, wherein receiving the second request comprises receiving a request to use a second MG configuration from the plurality of MG configurations, and wherein sending the response to the second request comprises sending an indication identifying an MG configuration from the plurality of MG configurations to be used by the UE.

Clause 163. The non-transitory computer-readable medium of clause 162, wherein the MG configuration indicated by the response to the second request is the same as the second MG configuration or different from the second MG configuration.

Clause 164. The non-transitory computer-readable medium of any of clauses 159 to 163, wherein receiving the second request comprises receiving a request to receive an updated plurality of MG configurations, and wherein sending the response to the second request comprises sending the updated plurality of MG configurations, the updated plurality of MG configurations comprising at least one new MG configuration.

Clause 165. The non-transitory computer-readable medium of any of clauses 159 to 164, wherein the response to the second request to change at least one MG configuration indicates that no MG configuration is changed.

Clause 166. The non-transitory computer-readable medium of any of clauses 159 to 165, wherein the network entity comprises a base station or a core network entity.

Clause 167. The non-transitory computer-readable medium of any of clauses 159 to 166, wherein the network entity comprises a core network entity.

Clause 168. The non-transitory computer-readable medium of clause 167, wherein the core network entity comprises a location management server (LMS) or a location management function (LMF).

Clause 169. An apparatus comprising a memory, a transceiver, and a processor communicatively coupled to the memory and the transceiver, the memory, the transceiver, and the processor configured to perform a method according to any of clauses 1 to 42.

Clause 170. An apparatus comprising means for performing a method according to any of clauses 1 to 42.

Clause 171. A non-transitory computer-readable medium storing computer-executable instructions, the computer-executable comprising at least one instruction for causing a computer or processor to perform a method according to any of clauses 1 to 42.

Additional aspects include the following:

In an aspect, a method of wireless communication performed by a user equipment (UE) includes determining a plurality of measurement gap (MG) configurations, each MG configuration defining one or more MGs, each MG having a measurement gap length (MGL) and a measurement gap offset (MGO); sending, to a serving base station, a first request to use a first MG configuration from the plurality of MG configurations; receiving, from the serving base station, a response to the first request; measuring a first set of positioning signals using an MG configuration indicated by the response to the first request; selecting, based on measurements of the first set of positioning signals, a second MG configuration from the plurality of MG configurations; sending, to the serving base station, a second request to use the second MG configuration from the plurality of MG configurations; receiving, from the serving base station, a response to the second request; and measuring a second set of positioning signals using an MG configuration indicated by the response to the second request.

In some aspects, the second MG configuration indicates a reference cell for measurement reporting.

In some aspects, the method includes sending a measurement report to the reference cell indicated by the second MG configuration.

In some aspects, determining the plurality of MG configurations comprises receiving the plurality of MG configurations from a base station or a core network entity.

In some aspects, determining the plurality of MG configurations comprises receiving the plurality of MG configurations from a location management server (LMS) or location management function (LMF).

In some aspects, determining the plurality of MG configurations comprises receiving the plurality of MG configurations via radio resource control (RRC) signaling.

In some aspects, the MG configuration indicated by the response to the first request is the same as the first MG configuration or different from the first MG configuration.

In some aspects, the MG configuration indicated by the response to the second request is the same as the second MG configuration or different from the second MG configuration.

In some aspects, at least one positioning signal within at least one of the first and second sets of positioning signals comprises a positioning reference signal (PRS) or a tracking reference signal (TRS).

In some aspects, selecting a second MG configuration from the plurality of MG configurations based on measurements of the first set of positioning signals comprises: identifying, from the first set of positioning signals, a first subset of positioning signals based on a quality metric; and selecting a second MG configuration from the plurality of MG configurations based on the first subset of positioning signals.

In some aspects, the quality metric comprises a reference signal received power (RSRP) value, a reference signal received quality (RSRQ) value, a signal to interference plus noise (SINR) value, a quality of a timing measurement, a dilution of precision metric, or various combinations thereof.

In some aspects, the first subset of positioning signals satisfy a quality metric and selecting the second MG configuration based on the first subset of positioning signals comprises selecting an MG configuration having an MG that includes the first subset of positioning signals.

In some aspects, selecting an MG configuration having an MG that includes the first subset of positioning signals comprises selecting an MG configuration having the smallest MG that includes the first subset of positioning signals.

In some aspects, the first subset of positioning signals fail to satisfy a quality metric and selecting the second MG configuration based on the first subset of positioning signals comprises selecting an MG configuration having an MG that excludes the first subset of positioning signals.

In some aspects, selecting an MG configuration having an MG that excludes the first subset of positioning signals comprises selecting an MG configuration having the largest MG that excludes the first subset of positioning signals.

In some aspects, the method includes detecting a first trigger condition; sending, to a serving base station, a request to use a default MG configuration from the plurality of MG configurations, the default MG configuration defining a default MG; receiving, from the serving base station, a response to the request to use the default MG configuration; and measuring a third set of positioning signals within the default MG.

In some aspects, detecting the first trigger condition comprises: detecting that a time limit for using the second MG has expired; detecting that a threshold number of measurements using the second MG has been satisfied; or receiving an instruction to stop using the second MG.

In some aspects, the default MG configuration comprises the first MG configuration, the default MG comprises the first MG, and the third set of positioning signals comprises the first set of positioning signals.

In an aspect, a method of wireless communication performed by a network entity includes sending, to a user equipment (UE), a plurality of measurement gap (MG) configurations, each MG configuration defining an MG having a measurement gap length (MGL) and a measurement gap offset (MGO); receiving, from the UE, a first request to use a first MG configuration from the plurality of MG configurations; and sending, to the UE, a response to the first request, indicating an MG configuration to be used by the UE.

In some aspects, the MG configuration indicated by the response to the first request is the same as the first MG configuration or different from the first MG configuration.

In some aspects, the method includes receiving, from the UE, a second request to use a second MG configuration from the plurality of MG configurations; and sending, to the UE, a response to the second request, indicating an MG configuration to be used by the UE.

In some aspects, the MG configuration indicated by the response to the second request is the same as the second MG configuration or different from the second MG configuration.

In some aspects, the network entity comprises a base station.

In some aspects, the network entity comprises a core network entity.

In some aspects, the core network entity comprises a location management server (LMS) or a location management function (LMF).

In an aspect, a user equipment (UE) includes a memory; at least one transceiver; and at least one processor communicatively coupled to the memory and the at least one transceiver, the at least one processor configured to: determine a plurality of measurement gap (MG) configurations, each MG configuration defining one or more MGs, each MG having a measurement gap length (MGL) and a measurement gap offset (MGO); cause the at least one transceiver to send, to a serving base station, a first request to use a first MG configuration from the plurality of MG configurations; cause the at least one transceiver to receive, from the serving base station, a response to the first request; measure a first set of positioning signals using an MG configuration indicated by the response to the first request; select, based on measurements of the first set of positioning signals, a second MG configuration from the plurality of MG configurations; cause the at least one transceiver to send, to the serving base station, a second request to use the second MG configuration from the plurality of MG configurations; cause the at least one transceiver to receive, from the serving base station, a response to the second request; and measure a second set of positioning signals using an MG configuration indicated by the response to the second request.

In some aspects, the second MG configuration indicates a reference cell for measurement reporting.

In some aspects, the at least one processor is further configured to cause the at least one transceiver to send a measurement report to the reference cell indicated by the second MG configuration.

In some aspects, determining the plurality of MG configurations comprises receiving the plurality of MG configurations from a base station or a core network entity.

In some aspects, determining the plurality of MG configurations comprises receiving the plurality of MG configurations from a location management server (LMS) or location management function (LMF).

In some aspects, determining the plurality of MG configurations comprises receiving the plurality of MG configurations via radio resource control (RRC) signaling.

In some aspects, the MG configuration indicated by the response to the first request is the same as the first MG configuration or different from the first MG configuration.

In some aspects, the MG configuration indicated by the response to the second request is the same as the second MG configuration or different from the second MG configuration.

In some aspects, at least one positioning signal within at least one of the first and second sets of positioning signals comprises a positioning reference signal (PRS) or a tracking reference signal (TRS).

In some aspects, selecting a second MG configuration from the plurality of MG configurations based on measurements of the first set of positioning signals comprises: identifying, from the first set of positioning signals, a first subset of positioning signals based on a quality metric; and selecting a second MG configuration from the plurality of MG configurations based on the first subset of positioning signals.

In some aspects, the quality metric comprises a reference signal received power (RSRP) value, a reference signal received quality (RSRQ) value, a signal to interference plus noise (SINR) value, a quality of a timing measurement, a dilution of precision metric, or various combinations thereof.

In some aspects, the first subset of positioning signals satisfy a quality metric and selecting the second MG configuration based on the first subset of positioning signals comprises selecting an MG configuration having an MG that includes the first subset of positioning signals.

In some aspects, selecting an MG configuration having an MG that includes the first subset of positioning signals comprises selecting an MG configuration having the smallest MG that includes the first subset of positioning signals.

In some aspects, the first subset of positioning signals fail to satisfy a quality metric and selecting the second MG configuration based on the first subset of positioning signals comprises selecting an MG configuration having an MG that excludes the first subset of positioning signals.

In some aspects, selecting an MG configuration having an MG that excludes the first subset of positioning signals comprises selecting an MG configuration having the largest MG that excludes the first subset of positioning signals.

In some aspects, the at least one processor is further configured to: detect a first trigger condition; cause the at least one transceiver to send, to a serving base station, a request to use a default MG configuration from the plurality of MG configurations, the default MG configuration defining a default MG; and measure a third set of positioning signals within the default MG.

In some aspects, detecting the first trigger condition comprises: detecting that a time limit for using the second MG has expired; detecting that a threshold number of measurements using the second MG has been satisfied; or receiving an instruction to stop using the second MG.

In some aspects, the default MG configuration comprises the first MG configuration, the default MG comprises the first MG, and the third set of positioning signals comprises the first set of positioning signals.

In an aspect, a network entity includes a memory; at least one communication interface; and at least one processor communicatively coupled to the memory and the at least one communication interface, the at least one processor configured to: cause the at least one communication interface to send, to a user equipment (UE), a plurality of measurement gap (MG) configurations, each MG configuration defining an MG having a measurement gap length (MGL) and a measurement gap offset (MGO); cause the at least one communication interface to receive, from the UE, a first request to use a first MG configuration from the plurality of MG configurations; and cause the at least one communication interface to send, to the UE, a response to the first request, indicating an MG configuration to be used by the UE.

In some aspects, the MG configuration indicated by the response to the first request is the same as the first MG configuration or different from the first MG configuration.

In some aspects, the at least one processor is further configured to: cause the at least one communication interface to receive, from the UE, a second request to use a second MG configuration from the plurality of MG configurations; and cause the at least one communication interface to send, to the UE, a response to the second request, indicating an MG configuration to be used by the UE.

In some aspects, the MG configuration indicated by the response to the second request is the same as the second MG configuration or different from the second MG configuration.

In some aspects, the network entity comprises a base station.

In some aspects, the network entity comprises a core network entity.

In some aspects, the core network entity comprises a location management server (LMS) or a location management function (LMF).

In an aspect, a user equipment (UE) includes means for determining a plurality of measurement gap (MG) configurations, each MG configuration defining one or more MGs, each MG having a measurement gap length (MGL) and a measurement gap offset (MGO); means for sending, to a serving base station, a first request to use a first MG configuration from the plurality of MG configurations; means for receiving, from the serving base station, a response to the first request; means for measuring a first set of positioning signals using an MG configuration indicated by the response to the first request; means for selecting, based on measurements of the first set of positioning signals, a second MG configuration from the plurality of MG configurations; means for sending, to the serving base station, a second request to use the second MG configuration from the plurality of MG configurations; means for receiving, from the serving base station, a response to the second request; and means for measuring a second set of positioning signals using an MG configuration indicated by the response to the second request.

In some aspects, the method includes means for detecting a first trigger condition; means for sending, to a serving base station, a request to use a default MG configuration from the plurality of MG configurations, the default MG configuration defining a default MG; means for receiving, from the serving base station, a response to the request to use the default MG configuration; and means for measuring a third set of positioning signals within the default MG.

In an aspect, a network entity includes means for sending, to a user equipment (UE), a plurality of measurement gap (MG) configurations, each MG configuration defining an MG having a measurement gap length (MGL) and a measurement gap offset (MGO); means for receiving, from the UE, a first request to use a first MG configuration from the plurality of MG configurations; and means for sending, to the UE, a response to the first request, indicating an MG configuration to be used by the UE.

In some aspects, the method includes means for receiving, from the UE, a second request to use a second MG configuration from the plurality of MG configurations; and means for sending, to the UE, a response to the second request, indicating an MG configuration to be used by the UE.

In an aspect, a non-transitory computer-readable medium containing instructions stored thereon for causing at least one processor in a user equipment (UE) to: determine a plurality of measurement gap (MG) configurations, each MG configuration defining one or more MGs, each MG having a measurement gap length (MGL) and a measurement gap offset (MGO); send, to a serving base station, a first request to use a first MG configuration from the plurality of MG configurations; receive, from the serving base station, a response to the first request; measure a first set of positioning signals using an MG configuration indicated by the response to the first request; select, based on measurements of the first set of positioning signals, a second MG configuration from the plurality of MG configurations; send, to the serving base station, a second request to use the second MG configuration from the plurality of MG configurations; receive, from the serving base station, a response to the second request; and measure a second set of positioning signals using an MG configuration indicated by the response to the second request.

In some aspects, the method includes detect a first trigger condition; send, to a serving base station, a request to use a default MG configuration from the plurality of MG configurations, the default MG configuration defining a default MG; and measure a third set of positioning signals within the default MG.

In an aspect, a non-transitory computer-readable medium containing instructions stored thereon for causing at least one processor in a network entity to: send, to a user equipment (UE), a plurality of measurement gap (MG) configurations, each MG configuration defining an MG having a measurement gap length (MGL) and a measurement gap offset (MGO); receive, from the UE, a first request to use a first MG configuration from the plurality of MG configurations; and send, to the UE, a response to the first request, indicating an MG configuration to be used by the UE.

In some aspects, the method includes receive, from the UE, a second request to use a second MG configuration from the plurality of MG configurations; and send, to the UE, a response to the second request, indicating an MG configuration to be used by the UE.

In an aspect, a method of wireless communication performed by a user equipment (UE) includes determining a plurality of measurement gap (MG) configurations, each MG configuration defining one or more MGs, each MG having a measurement gap length (MGL) and a measurement gap offset (MGO); measuring a first set of positioning signals using an MG configuration having a largest MGL from among the plurality of MG configurations; determining that none of the positioning signals in the first set of positioning signals meets a minimum quality standard; sending, to the serving base station, a request to receive an updated plurality of MG configurations; receiving, from the serving base station, an updated plurality of MG configurations, the updated plurality of MG configurations comprising at least one new MG configuration; and measuring a second set of positioning signals using an MG configuration from among the updated plurality of MG configurations.

In an aspect, a method of wireless communication performed by a network entity includes receiving, from a user equipment (UE), a request to receive an updated plurality of measurement gap (MG) configurations, each MG configuration defining one or more MGs, each MG having a measurement gap length (MGL) and a measurement gap offset (MGO); and sending, to the UE, an updated plurality of MG configurations, the updated plurality of MG configurations comprising at least one new MG configuration.

The solutions presented herein provide at least the following technical advantages. For on-demand PRS, the techniques presented herein can be used to improve the PRS overhead, by allowing the UE to decode a smaller number of PRSs in tracking mode, and by allowing the base station or core network entity to stop scheduling PRSs outside of the requested measurement gap. The same benefits apply for regularly broadcasted PRSs. The same benefits also apply to TRSs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a set of two or more microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), the method comprising:
   determining a plurality of measurement gap (MG) configurations, each MG configuration defining one or more MGs, each MG having a measurement gap length (MGL) and a measurement gap offset (MGO);
   sending, to a serving base station, a first request to use a first MG configuration from the plurality of MG configurations;
   receiving, from the serving base station, a response to the first request;
   measuring a first set of positioning signals using an MG configuration indicated by the response to the first request;
   selecting, based on measurements of the first set of positioning signals, a second MG configuration from the plurality of MG configurations;
   sending, to the serving base station, a second request to use the second MG configuration from the plurality of MG configurations;
   receiving, from the serving base station, a response to the second request; and
   measuring a second set of positioning signals using an MG configuration indicated by the response to the second request.

2. The method of claim 1, wherein the second MG configuration indicates a reference cell for measurement reporting and wherein the method further comprises sending a measurement report to the reference cell indicated by the second MG configuration.

3. The method of claim 1, wherein the MG configuration indicated by the response to the first request is the same as the first MG configuration or different from the first MG configuration.

4. The method of claim 1, wherein the MG configuration indicated by the response to the second request is the same as the second MG configuration or different from the second MG configuration.

5. The method of claim 1, wherein at least one positioning signal within at least one of the first set of positioning signals or the second set of positioning signals comprises a positioning reference signal (PRS) or a tracking reference signal (TRS).

6. The method of claim 1, wherein selecting the second MG configuration from the plurality of MG configurations based on the measurements of the first set of positioning signals comprises:
identifying, from the first set of positioning signals, a first subset of positioning signals based on a quality metric; and
selecting the second MG configuration from the plurality of MG configurations based on the first subset of positioning signals.

7. The method of claim 6, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

8. The method of claim 6, wherein the first subset of positioning signals satisfy a quality metric and wherein selecting the second MG configuration based on the first subset of positioning signals comprises selecting an MG configuration having an MG that includes the first subset of positioning signals.

9. The method of claim 8, wherein selecting the MG configuration having the MG that includes the first subset of positioning signals comprises selecting an MG configuration having the smallest MG that includes the first subset of positioning signals.

10. The method of claim 6, wherein the first subset of positioning signals fail to satisfy a quality metric and wherein selecting the second MG configuration based on the first subset of positioning signals comprises selecting an MG configuration having an MG that excludes the first subset of positioning signals.

11. The method of claim 10, wherein selecting the MG configuration having the MG that excludes the first subset of positioning signals comprises selecting an MG configuration having the largest MG that excludes the first subset of positioning signals.

12. The method of claim 1, further comprising:
detecting a first trigger condition;
sending, to the serving base station, a request to use a default MG configuration from the plurality of MG configurations, the default MG configuration defining a default MG;
receiving, from the serving base station, a response to the request to use the default MG configuration; and
measuring a third set of positioning signals using an MG configuration indicated by the response to the request to use the default MG configuration.

13. The method of claim 12, wherein detecting the first trigger condition comprises:
detecting that a time limit for using the second MG configuration has expired;
detecting that a threshold number of measurements using the second MG configuration has been satisfied; or
receiving an instruction to stop using the second MG configuration.

14. A method of wireless communication performed by a user equipment (UE), the method comprising:
determining a plurality of measurement gap (MG) configurations, each MG configuration defining one or more MGs, each MG having a measurement gap length (MGL) and a measurement gap offset (MGO) and indicating a reference cell for measurement reporting;
measuring a first set of positioning signals using one MG configuration from the plurality of MG configurations; and
reporting the measurement to the reference cell for measurement reporting indicated by the one MG configuration.

15. The method of claim 14, further comprising:
sending, to a serving base station, a second request to use a second MG configuration from the plurality of MG configurations;
receiving, from the serving base station, a response to the second request; and
measuring a second set of positioning signals using an MG configuration indicated by the response to the second request; and
reporting the measurement to the reference cell for measurement reporting indicated by the MG configuration indicated by the response to the second request.

16. The method of claim 15, wherein sending the second request comprises selecting the second MG configuration from the plurality of MG configurations based on measurements of the first set of positioning signals.

17. The method of claim 16, wherein selecting the second MG configuration from the plurality of MG configurations based on the measurements of the first set of positioning signals comprises:
identifying, from the first set of positioning signals, a first subset of positioning signals based on a quality metric; and
selecting the second MG configuration from the plurality of MG configurations based on the first subset of positioning signals.

18. The method of claim 17, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

19. The method of claim 15, wherein one MG configuration of the plurality of MG configurations is identified as a default MG configuration.

20. The method of claim 19, further comprising:
detecting a first trigger condition;
sending, to the serving base station, a request to use the default MG configuration from the plurality of MG configurations, the default MG configuration defining a default MG;
receiving, from the serving base station, a response to the request to use the default MG configuration; and
measuring a third set of positioning signals using an MG configuration indicated by the response to the request to use the default MG configuration.

21. The method of claim 20, wherein detecting the first trigger condition comprises:
  detecting that a time limit for using the second MG configuration has expired;
  detecting that a threshold number of measurements using the second MG configuration has been satisfied; or
  receiving an instruction to stop using the second MG configuration.

22. A method of wireless communication performed by a user equipment (UE), the method comprising:
  determining a plurality of measurement gap (MG) configurations, each MG configuration defining one or more MGs, each MG having a measurement gap length (MGL) and a measurement gap offset (MGO);
  sending, to a serving base station, a first request to use a first MG configuration from the plurality of MG configurations;
  receiving, from the serving base station, a response to the first request;
  measuring a first set of positioning signals using an MG configuration indicated by the response to the first request;
  sending, to the serving base station, a request to receive an updated plurality of MG configurations;
  receiving, from the serving base station, the updated plurality of MG configurations, the updated plurality of MG configurations comprising at least one new MG configuration; and
  measuring a second set of positioning signals using an MG configuration from among the updated plurality of MG configurations.

23. The method of claim 22, wherein sending the request to receive the updated plurality of MG configurations comprises sending the request in response to determining that no positioning signal in the first set of positioning signals meets a minimum quality standard.

24. A user equipment (UE), comprising:
  a memory;
  at least one transceiver; and
  at least one processor communicatively coupled to the memory and the at least one transceiver, the at least one processor configured to:
  determine a plurality of measurement gap (MG) configurations, each MG configuration defining one or more MGs, each MG having a measurement gap length (MGL) and a measurement gap offset (MGO);
  send, via the at least one transceiver, to a serving base station, a first request to use a first MG configuration from the plurality of MG configurations;
  receive, via the at least one transceiver, from the serving base station, a response to the first request;
  measure a first set of positioning signals using an MG configuration indicated by the response to the first request;
  select, based on measurements of the first set of positioning signals, a second MG configuration from the plurality of MG configurations;
  send, via the at least one transceiver, to the serving base station, a second request to use the second MG configuration from the plurality of MG configurations;
  receive, via the at least one transceiver, from the serving base station, a response to the second request; and
  measure a second set of positioning signals using an MG configuration indicated by the response to the second request.

25. The UE of claim 24, wherein the second MG configuration indicates a reference cell for measurement reporting and wherein the at least one processor is further configured to send a measurement report to the reference cell indicated by the second MG configuration.

26. The UE of claim 24, wherein the MG configuration indicated by the response to the first request is the same as the first MG configuration or different from the first MG configuration.

27. The UE of claim 24, wherein the MG configuration indicated by the response to the second request is the same as the second MG configuration or different from the second MG configuration.

28. The UE of claim 24, wherein at least one positioning signal within at least one of the first set of positioning signals or the second set of positioning signals comprises a positioning reference signal (PRS) or a tracking reference signal (TRS).

29. The UE of claim 24, wherein, to select the second MG configuration from the plurality of MG configurations based on the measurements of the first set of positioning signals, the at least one processor is configured to:
  identify, from the first set of positioning signals, a first subset of positioning signals based on a quality metric; and
  select the second MG configuration from the plurality of MG configurations based on the first subset of positioning signals.

30. The UE of claim 29, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

31. The UE of claim 29, wherein the first subset of positioning signals satisfy a quality metric and wherein, to select the second MG configuration based on the first subset of positioning signals, the at least one processor is configured to select an MG configuration having an MG that includes the first subset of positioning signals.

32. The UE of claim 31, wherein, to select the MG configuration having the MG that, the at least one processor is configured to the first subset of positioning signals comprises selecting an MG configuration having the smallest MG that includes the first subset of positioning signals.

33. The UE of claim 29, wherein the first subset of positioning signals fail to satisfy a quality metric and wherein, to select the second MG configuration based on the first subset of positioning signals, the at least one processor is configured to select an MG configuration having an MG that excludes the first subset of positioning signals.

34. The UE of claim 33, wherein, to select the MG configuration having the MG that excludes the first subset of positioning signals, the at least one processor is configured to select an MG configuration having the largest MG that excludes the first subset of positioning signals.

35. The UE of claim 24, wherein the at least one processor is further configured to:
  detect a first trigger condition;
  send, via the at least one transceiver, to the serving base station, a request to use a default MG configuration from the plurality of MG configurations, the default MG configuration defining a default MG;
  receive, via the at least one transceiver, from the serving base station, a response to the request to use the default MG configuration; and
  measure a third set of positioning signals using an MG configuration indicated by the response to the request to use the default MG configuration.

36. The UE of claim 35, wherein, to detect the first trigger condition, the at least one processor is configured to:
  detect that a time limit for using the second MG configuration has expired;
  detect that a threshold number of measurements using the second MG configuration has been satisfied; or
  receive, via the at least one transceiver, an instruction to stop using the second MG configuration.

37. A user equipment (UE), comprising:
  a memory;
  at least one transceiver; and
  at least one processor communicatively coupled to the memory and the at least one transceiver, the at least one processor configured to:
    determine a plurality of measurement gap (MG) configurations, each MG configuration defining one or more MGs, each MG having a measurement gap length (MGL) and a measurement gap offset (MGO) and indicating a reference cell for measurement reporting;
    measure a first set of positioning signals using one MG configuration from the plurality of MG configurations; and
    report the measurement to the reference cell for measurement reporting indicated by the one MG configuration.

38. The UE of claim 37, wherein the at least one processor is further configured to:
  send, via the at least one transceiver, to a serving base station, a second request to use a second MG configuration from the plurality of MG configurations;
  receive, via the at least one transceiver, from the serving base station, a response to the second request; and
  measure a second set of positioning signals using an MG configuration indicated by the response to the second request; and
  report the measurement to the reference cell for measurement reporting indicated by the MG configuration indicated by the response to the second request.

39. The UE of claim 38, wherein, to send the second request, the at least one processor is configured to select the second MG configuration from the plurality of MG configurations based on measurements of the first set of positioning signals.

40. The UE of claim 39, wherein, to select the second MG configuration from the plurality of MG configurations based on the measurements of the first set of positioning signals, the at least one processor is configured to:
  identify, from the first set of positioning signals, a first subset of positioning signals based on a quality metric; and
  select the second MG configuration from the plurality of MG configurations based on the first subset of positioning signals.

41. The UE of claim 40, wherein the quality metric comprises a reference signal received power (RSRP) value, a reference signal received quality (RSRQ) value, a signal to interference plus noise (SINK) value, a quality of a timing measurement, a dilution of precision metric, or various combinations thereof.

42. The UE of claim 38, wherein one MG configuration of the plurality of MG configurations is identified as a default MG configuration.

43. The UE of claim 42, wherein the at least one processor is further configured to:
  detect a first trigger condition;
  send, via the at least one transceiver, to the serving base station, a request to use the default MG configuration from the plurality of MG configurations, the default MG configuration defining a default MG;
  receive, via the at least one transceiver, from the serving base station, a response to the request to use the default MG configuration; and
  measure a third set of positioning signals using an MG configuration indicated by the response to the request to use the default MG configuration.

44. The UE of claim 43, wherein, to detect the first trigger condition, the at least one processor is configured to:
  detect that a time limit for using the second MG configuration has expired;
  detect that a threshold number of measurements using the second MG configuration has been satisfied; or
  receive, via the at least one transceiver, an instruction to stop using the second MG configuration.

45. A user equipment (UE), comprising:
  a memory;
  at least one transceiver; and
  at least one processor communicatively coupled to the memory and the at least one transceiver, the at least one processor configured to:
    determine a plurality of measurement gap (MG) configurations, each MG configuration defining one or more MGs, each MG having a measurement gap length (MGL) and a measurement gap offset (MGO);
    send, via the at least one transceiver, to a serving base station, a first request to use a first MG configuration from the plurality of MG configurations;
    receive, via the at least one transceiver, from the serving base station, a response to the first request;
    measure a first set of positioning signals using an MG configuration indicated by the response to the first request;
    send, via the at least one transceiver, to the serving base station, a request to receive an updated plurality of MG configurations;
    receive, via the at least one transceiver, from the serving base station, the updated plurality of MG configurations, the updated plurality of MG configurations comprising at least one new MG configuration; and
    measure a second set of positioning signals using an MG configuration from among the updated plurality of MG configurations.

46. The UE of claim 45, wherein, to send the request to receive the updated plurality of MG configurations, the at least one processor is configured to send the request in response to determining that no positioning signal in the first set of positioning signals meets a minimum quality standard.

* * * * *